US011235234B2

(12) United States Patent
Wu et al.

(10) Patent No.: US 11,235,234 B2
(45) Date of Patent: Feb. 1, 2022

(54) METHOD FOR MOVEMENT SYNCHRONIZATION OF VIRTUAL OBJECT, CLIENT, SERVER, AND STORAGE MEDIUM

(71) Applicant: TENCENT TECHNOLOGY (SHENZHEN) COMPANY LIMITED, Shenzhen (CN)

(72) Inventors: Yifan Wu, Shenzhen (CN); Lei Liu, Shenzhen (CN); Chao He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 88 days.

(21) Appl. No.: 16/206,717

(22) Filed: Nov. 30, 2018

(65) Prior Publication Data

US 2019/0091569 A1    Mar. 28, 2019

Related U.S. Application Data

(63) Continuation of application No. PCT/CN2017/096436, filed on Aug. 8, 2017.

(30) Foreign Application Priority Data

Aug. 8, 2016    (CN) ......................... 201610643328.4

(51) Int. Cl.
*A63F 13/00*    (2014.01)
*A63F 13/35*    (2014.01)
(Continued)

(52) U.S. Cl.
CPC .............. *A63F 13/35* (2014.09); *A63F 13/45* (2014.09); *A63F 13/52* (2014.09); *G06T 7/246* (2017.01);
(Continued)

(58) Field of Classification Search
CPC .............. H04L 67/104; H04L 67/1095; H04N 21/2187; H04N 21/234; H04N 21/23406;
(Continued)

(56) References Cited

U.S. PATENT DOCUMENTS 7,293,235 B1 * 11/2007 Powers ..................... G06T 7/20
                                                               463/1
9,192,863 B2 * 11/2015 Ladell ..................... G06T 11/40
(Continued)

FOREIGN PATENT DOCUMENTS

CN          1941788 A      4/2007
CN        102769616 A     11/2012
(Continued)

OTHER PUBLICATIONS

"Client-side prediction", Mar. 17, 2015, https://en.wikipedia.org, <https://en.wikipedia.org/w/index.php?title=Client-side_prediction& oldid=651766417> (Year: 2015).*
(Continued)

*Primary Examiner* — Justin L Myhr
(74) *Attorney, Agent, or Firm* — Oblon, McClelland, Maier & Neustadt, L.L.P.

(57) ABSTRACT

The application discloses a method for motion synchronization of a virtual object. A first accumulation time and a second accumulation time are detected. The first accumulation time is accumulated from a previous speed update of the virtual object. The second accumulation time is accumulated from a previous location update of the virtual object. A speed of the virtual object is updated when the first accumulation time reaches a preset speed update time. In addition, the first accumulation time is reset after the speed of the virtual object is updated. A location of the virtual object is updated when the second accumulation time reaches a preset location update time. The second accumulation time is reset after the
(Continued)

location of the virtual object is updated. The preset speed update time is greater than the preset location update time.

19 Claims, 13 Drawing Sheets

(51) Int. Cl.
    *A63F 13/45*     (2014.01)
    *A63F 13/52*     (2014.01)
    *H04L 29/06*     (2006.01)
    *H04L 29/08*     (2006.01)
    *G06T 7/246*     (2017.01)

(52) U.S. Cl.
    CPC ...... *H04L 29/0854* (2013.01); *H04L 67/1095* (2013.01); *H04L 67/18* (2013.01); *H04L 67/38* (2013.01); *H04L 67/42* (2013.01)

(58) Field of Classification Search
    CPC ....... H04N 21/42204; H04N 21/44204; H04N 5/144; A63F 13/34; A63F 13/35; A63F 13/358; A63F 13/42; A63F 13/45; A63F 13/52; A63F 13/79; A63F 2300/64
    See application file for complete search history.

(56) References Cited

U.S. PATENT DOCUMENTS

| | | | | |
|---|---|---|---|---|
| 9,472,165 | B2* | 10/2016 | Li | G09G 5/12 |
| 2006/0154713 | A1* | 7/2006 | Sunazuka | A63F 13/803 463/6 |
| 2007/0207844 | A1* | 9/2007 | Pottinger | A63F 13/69 463/9 |
| 2007/0269054 | A1* | 11/2007 | Takagi | A63F 13/10 381/86 |
| 2010/0099469 | A1* | 4/2010 | Tsurumoto | A63F 13/56 463/1 |
| 2012/0142422 | A1* | 6/2012 | Mori | A63F 13/812 463/42 |
| 2014/0024447 | A1* | 1/2014 | Le | A63F 13/358 463/31 |

FOREIGN PATENT DOCUMENTS

| | | |
|---|---|---|
| CN | 103701918 A | 4/2014 |
| CN | 104954349 A | 9/2015 |
| CN | 106302679 A | 1/2017 |
| JP | 10-272256 A | 10/1998 |

OTHER PUBLICATIONS

Glenn Fiedler, "State Synchronization", gafferongames, Jan. 5, 2015, <https://gafferongames.com/post/state_synchronization/> (Year: 2015).*
International Search Report dated Oct. 11, 2017 in PCT/CN2017/096436, with English translation, citing documents AO-AT therein.
Li et al.—"GameOD: An Internet Based Game-On-Demand Framework" ACM Symposium On Virtual Reality Software and Technology, ACM, US. Nov. 10, 2004, pp. 129-136, XP002658451.
Li et al.—"Game-On-Demand An Online Game Engine Based On Geometry Streaming" ACM Transactions On Multimedia Computing Communications and Applications, vol. 7, No. 3, Aug. 1, 2011 pp. 1-22, XP055650356.
Li et al.—"Consistency Aware Dead Reckoning Threshold Tuning with Server Assistance in Client-Server-Based DVEs" Computer and Information Technology (CIT) 2010 IEE 10$^{th}$ International Conference on Computer and Information Technology , Jun. 29, 2010, pp. 2925-2932, XP031758088.
Office Action dated Feb. 3, 2020 issued in corresponding European patent application 17838696.7 citing documents AW-AY therein.

* cited by examiner

1. Turn ω/2
2. Move 2sin(ω/2)r
3. Turn ω/2

ω = angular speed * Δt
r = Radius of a circle

Simulate an angular speed by using a linear speed

Variable circular motion

METHOD FOR MOVEMENT SYNCHRONIZATION OF VIRTUAL OBJECT, CLIENT, SERVER, AND STORAGE MEDIUM

RELATED APPLICATION

This application is a continuation of International Application No. PCT/CN2017/096436, filed on Aug. 8, 2017, which claims priority to Chinese Patent Application No. 201610643328.4, entitled "Method for movement synchronization of virtual object, client, server, and storage medium" filed with the Chinese Patent Office on Aug. 8, 2016. The entire disclosures of the prior applications are hereby incorporated by reference in their entirety.

FIELD OF THE TECHNOLOGY

This application relates to the field of data processing technologies.

BACKGROUND OF THE DISCLOSURE

Movement synchronization of a virtual object means that a moving state of the virtual object controlled in a client needs to be consistent with a moving state of the virtual object controlled in a server. That is, updating of the moving state of the virtual object by the client needs to be consistent with updating of the moving state of the virtual object by the server. The virtual object is usually applied in a virtual scenario, such as a game or a simulation. Using a game scenario as an example, the virtual object is, for example, a game character controlled by a game user, or a logical object (for example, a monster) in a game. If a user performs a movement control operation for a game object on a game client side, and controls the game object to run forward, the game client and a game server need to synchronously control the game object to run forward, so that moving control of a same game object by the game client and by the game server is consistent.

The movement synchronization of a virtual object is a basis for maintaining consistent processing of movement data of a same virtual object by a client and by a server and for maintaining stable operation of a virtual scenario such as a game or a simulation.

SUMMARY

Embodiments of this disclosure provide a method for motion synchronization of a virtual object, a client, a server, and a storage medium.

Aspects of the disclosure provide a method for motion synchronization of a virtual object. A first accumulation time and a second accumulation time are detected. The first accumulation time is accumulated from a previous speed update of the virtual object. The second accumulation time is accumulated from a previous location update of the virtual object. A speed of the virtual object is updated when the first accumulation time reaches a preset speed update time. In addition, the first accumulation time is reset after the speed of the virtual object is updated. A location of the virtual object is updated when the second accumulation time reaches a preset location update time. The second accumulation time is reset after the location of the virtual object is updated. The preset speed update time is greater than the preset location update time.

Aspects of the disclosure provide a method for motion synchronization of a virtual object. A system accumulation time is detected. The system accumulation time is accumulated from a previous speed and location update of the virtual object by the server. A speed and a location of the virtual object are updated by the processing circuitry of the server when the system accumulation time reaches a preset system update time.

Aspects of the disclosure provide a non-transitory computer-readable storage medium storing a program executable by a processor of a terminal device to implement motion synchronization of a virtual object. A first accumulation time and a second accumulation time are detected. The first accumulation time is accumulated from a previous speed update of the virtual object. The second accumulation time is accumulated from a previous location update of the virtual object. A speed of the virtual object is updated when the first accumulation time reaches a preset speed update time. In addition, the first accumulation time is reset after the speed of the virtual object is updated. A location of the virtual object is updated when the second accumulation time reaches a preset location update time. The second accumulation time is reset after the location of the virtual object is updated. The preset speed update time is greater than the preset location update time.

According to the embodiments of this disclosure, for different update requirements on the speed and the location of the virtual object, the updating is performed by using different frequencies. In an embodiment, the speed of the virtual object is updated by the client and the server at a low frequency, the location of the virtual object is updated by the server at the same low frequency, and the location of the virtual object is updated by the client at a high frequency, so that the speed and location update of the virtual object satisfies an actual operating requirement of a virtual scenario, thereby achieving a movement synchronization effect with a relatively high accuracy. Moreover, both the speed and the location are updated by the server at the low frequency, thereby greatly reducing performance overhead of the server. It may be learned that, according to the embodiments of this disclosure, the performance overhead of the server may be reduced while ensuring the movement synchronization effect with the relatively high accuracy.

BRIEF DESCRIPTION OF THE DRAWINGS

To describe the technical solutions in the embodiments of the present disclosure, the following briefly describes the accompanying drawings to describe the embodiments. The accompanying drawings in the following description are embodiments of the present disclosure, and persons of ordinary skill in the art may still derive other drawings from these accompanying drawings.

DESCRIPTION OF EMBODIMENTS

The following describes the technical solutions in the embodiments of this disclosure with reference to the accompanying drawings in the embodiments of this disclosure. The described embodiments are some embodiments of this disclosure rather than all of the embodiments. All other embodiments obtained by persons of ordinary skill in the art based on the embodiments in this disclosure shall fall within the protection scope of the present disclosure.

Figure 1:
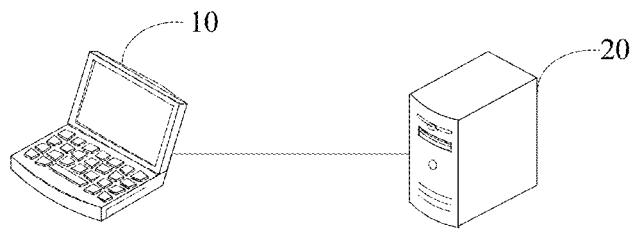
FIG. 1 shows a structural block diagram of a system for movement synchronization of a virtual object according to an embodiment of this disclosure.

FIG. 1 is a structural block diagram of a system for movement synchronization of a virtual object according to an embodiment of this disclosure. Referring to FIG. 1, the system for movement synchronization of a virtual object includes a client 10 and a server 20. Using a virtual game scenario as an example, the client 10 may be a game client, and the server 20 may be a game server. Using a virtual simulation scenario as an example, the client 10 may be a simulation client, and the server 20 may be a simulation server.

The client 10 may be a client that is disposed on a terminal device and that provides local services for a virtual scenario such as a network game.

The server 20 may be a server that is on a network side and that provides network services for a virtual scenario such as a network game. The server may be implemented by using a single server, or may be implemented by using a server group including multiple servers.

In this embodiment of this disclosure, movement synchronization of a virtual object includes speed synchronization of the virtual object and location synchronization of the virtual object. The client needs to respectively update a speed and a location of the virtual object, and the server needs to respectively update the speed and the location of the virtual object. Moreover, the speed of the virtual object updated by the client needs to be consistent with the speed of the virtual object updated by the server, and the location of the virtual object updated by the client needs to be consistent with the location of the virtual object updated by the server.

A frequency at which the speed of the virtual object is updated by the client may be a frequency at which the speed of the virtual object is updated by the server, and the speed of the virtual object is updated at a low frequency. Because when there is no user interference, continuity of the speed of the virtual object that is kept in a speed change trend is relatively strong. In this embodiment of this disclosure, the speed of the virtual object may be updated at a low frequency. Moreover, considering performance overhead of the server, a speed update frequency of the virtual object of the client may be a speed update frequency of the virtual object of the server. For example, the client and the server specify a speed update frequency of the virtual object, and the client updates the speed of the virtual object at the specified frequency.

When the location of the virtual object is updated, to ensure processing smoothness of the client, the client may update the location of the virtual object at a high frequency. However, considering the performance overhead of the server, the server may update the location of the virtual object at a low frequency the same as the speed update frequency.

In this embodiment of this disclosure, the movement synchronization of the virtual object includes the speed synchronization of the virtual object and the location synchronization of the virtual object. The client and the server are allowed to update the speed and the location of the virtual object at different update frequencies. The speed update frequency is subject to setting of the server, and the speed is updated at a low frequency. Moreover, the client updates the location at a high frequency, and the server updates the location at a same low frequency. For different update requirements on the speed and the location of the virtual object, in this embodiment of this disclosure, the speed and the location are updated at different frequencies, so that the speed and location updates of the virtual object meet an operation requirement of an actual virtual scenario, to obtain a movement synchronization effect with a relatively high accuracy. Moreover, the server updates both the speed and the location at the low frequency, thereby greatly reducing the performance overhead of the server.

Figure 2:
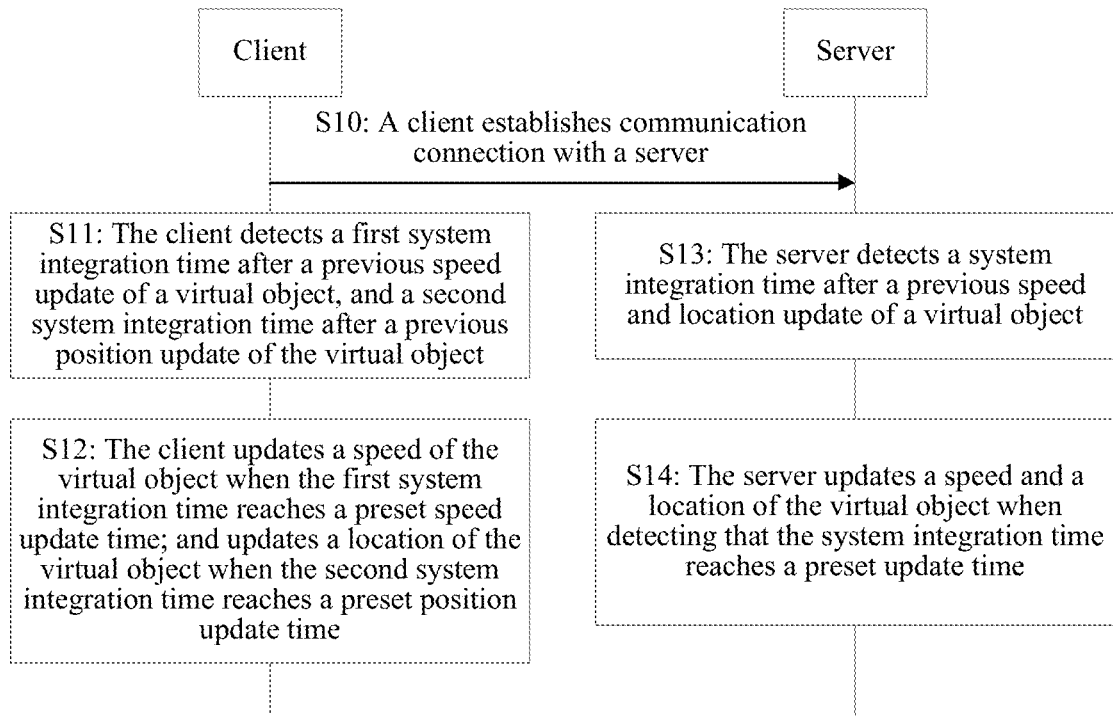
FIG. 2 shows a signaling flowchart of a method for movement synchronization of a virtual object according to an embodiment of this disclosure.

With reference to the system for movement synchronization of a virtual object shown in FIG. 1, FIG. 2 is a signaling flowchart of a method for movement synchronization of a virtual object according to an embodiment of this disclosure. Referring to FIG. 2, the procedure may include the following steps S10 to S14.

In step S10, a client establishes communication connection with a server.

The client may enable a network game, a simulation application, or the like, to upload a virtual scenario, and establish communication connection with the server.

In step S11, the client detects a first system integration time, such as a first accumulation time, after a previous speed update of a virtual object, and a second system integration time, such as a second accumulation time, after a previous location update of the virtual object.

Using a game scenario as an example, the virtual object may be a game character controlled by the client, or may be another game character or a logic object in the game scenario currently displayed by the client. Using a virtual simulation scenario as an example, the virtual object may be a simulation object (a simulation object such as a motional person or animal) controlled by the client.

The previous speed update of the virtual object in the client is a last speed update of the virtual object. The last speed update of the virtual object may be a speed update performed at a low frequency by using the procedure shown in FIG. 2; or the last speed update of the virtual object may be a speed update performed by the client based on a movement update synchronization packet of the server.

The previous location update of the virtual object is a last location update of the virtual object. The last location update of the virtual object may be a location update performed at a high frequency by using the procedure shown in FIG. 2; or the last location update of the virtual object may be a location update performed by the client based on a movement control operation of a user or the movement update synchronization packet of the server.

In an implementation, the first system integration time may be recalculated each time after the client updates a speed of the virtual object, and the second system integration time may be recalculated each time after the client updates a location of the virtual object. In an embodiment, the first system integration time may be reset to a first time and restarted each time after the client updates a speed of the virtual object. In an example, the first time can be zero. In an embodiment, the second system integration time may be reset to a second time and restarted each time after the client updates a location of the virtual object. In an example, the second time can be zero. In step S12, the client updates a speed of the virtual object when the first system integration time reaches a preset speed update time; and updates a location of the virtual object when the second system integration time reaches a preset location update time.

In an implementation, the preset speed update time may be a frequency time corresponding to a set low frequency, and the preset location update time may be a frequency time corresponding to a set high frequency. The preset speed update time and the preset location update time may be set according to performance of a the terminal device on which the client is located and a requirement of a user for a virtual scenario, provided that the preset speed update time is greater than the preset location update time. To be specific, the client may update the speed of the virtual object at relatively large time intervals, and updates the location of the virtual object at relatively small time intervals.

The client may update the speed of the virtual object each time when the first system integration time reaches the preset speed update time, to achieve a purpose of updating the speed of the virtual object at a low frequency. The client may update the location of the virtual object each time when the second system integration time reaches the preset location update time, to achieve a purpose of updating the location of the virtual object at a high frequency.

In this embodiment of this disclosure, the client may detect the first system integration time and the second system integration time in real time or at regular intervals, updates the speed each time when detecting that the first system integration time reaches the preset speed update time, and updates the location each time when detecting that the second system integration time reaches the preset location update time; moreover, recalculates the first system integration time each time after updating the speed, and recalculates the second system integration time each time after updating the location.

In an implementation, the client may detect the first system integration time and the second system integration time each tick (tick is a core timing unit of an operating system, and one tick represents a logic calculation time).

In step S13, the server detects a system integration time after a previous speed and location update of a virtual object.

The server updates the speed and the location of the virtual object at a same frequency, so that the server may simultaneously update the speed and the location of the virtual object. In this embodiment of this disclosure, the system integration time after the previous speed and location updates of the virtual object may be detected in a unified manner.

The speed and location updates of the virtual object in the server may be last speed and location updates of the virtual object. The last speed and location updates of the virtual object may be speed and location updates performed at a low frequency by using a procedure shown in FIG. 2; or may be speed and location updates performed by the server based on a movement control operation of a user, or speed and location updates performed by the server based on switch of a moving state of the virtual object in a virtual scenario. The switch of the moving state of the virtual object is a case, for example, the speed of the virtual object is suddenly reduced to zero when the virtual object collides with an obstacle during movement, or the virtual object suddenly drops down from a height.

In this embodiment of this disclosure, the system integration time may be recalculated each time after the server updates the speed and the location of the virtual object, for example, zero out and recalculate the system integration time, or reset the system integration time to a preset time value and recalculate the system integration time from the preset time value.

In step S14, the server updates a speed and a location of the virtual object when detecting that the system integration time reaches a preset update time.

The preset update time may be the same as the preset speed update time set by the client, so that the client and the server may update the speed at a same low frequency. Moreover, the server updates the location at the same low frequency, to reduce performance overhead of the server, and the speed update of the virtual object is kept synchronized between the client and the server; however, the client updates the location update at a high frequency, to ensure processing smoothness of the client.

In this embodiment of this disclosure, the server may detect the system integration time in real time or at regular intervals, and updates the speed and location each time when detecting that the system integration time reaches the preset update time, and recalculates the system integration time each time after updating the speed and location. In an implementation, the server may detect the system integration time once each tick.

In the procedure shown in FIG. 2, in an embodiment, step S12 can be implemented after step S11 is implemented. In an embodiment, step S11 can be implemented after step S12 is implemented. Similarly, in an embodiment, step S13 can be implemented after step S14 is implemented. In an embodiment, step S14 can be implemented after step S13 is implemented. After the virtual scenario, such as a network game, is enabled, the client and the server may separately update the speed and the location of the location update according to steps S11 and S12 and steps S13 and S14.

According to this embodiment of this disclosure, for different update requirements on the speed and the location of the virtual object, updating is performed by using different frequencies. To be specific, the speed of the virtual object is updated by the client and the server at a low frequency, the location of the virtual object is updated by the server at the same low frequency, and the location of the virtual object is updated by the client at a high frequency, so that the speed and location update of the virtual object satisfies an actual operating requirement of the virtual scenario, thereby achieving a movement synchronization effect with a relatively high accuracy. Moreover, the server updates the speed and the location both at the low frequency, greatly reducing the performance overhead of the server. It may be learned that, according to this embodiment of this disclosure, the performance overhead of the server may be reduced while ensuring the movement synchronization effect with the relatively high accuracy.

The location update of the virtual object by the client may be triggered based on the movement control operation of the user, or the speed update of the virtual object may be triggered based on the movement update synchronization packet sent by the server.

Correspondingly, after detecting the movement control operation of the user and determining a movement control parameter of the virtual object that is indicated by the movement control operation, the client may update the location based on the movement control parameter and at a current speed of the virtual object, and sent a corresponding movement control operation request of the user to the server. In an example, the movement control parameter can include a set of parameters.

The server may update the location and the speed of the virtual object based on the movement control parameter indicated by the movement control operation request of the user. Moreover, after updating the location and the speed of the virtual object, the server may generate the movement update synchronization packet and send the movement update synchronization packet to the client; the client may update the speed of the virtual object based on the movement update synchronization packet.

Figure 3:
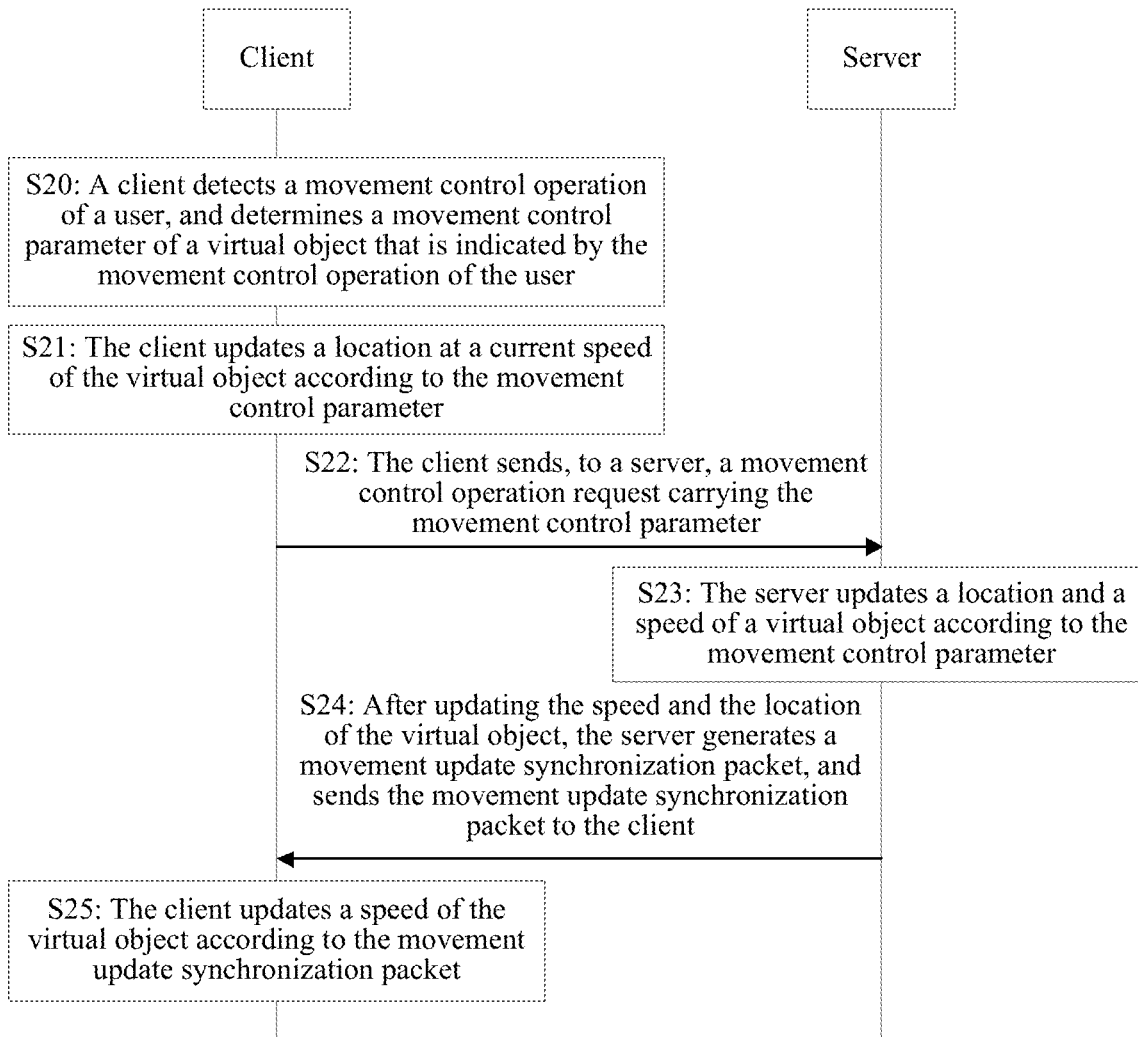
FIG. 3 shows a signaling flowchart of a method for movement synchronization of a virtual object according to an embodiment of this disclosure.

On the basis of the procedure shown in FIG. 2, FIG. 3 is another signaling flowchart of a method for movement synchronization of a virtual object according to an embodiment of this disclosure. Referring to 3, the procedure may include the following steps S20 to S25.

In step S20, a client detects a movement control operation of a user, and determines a movement control parameter of a virtual object that is indicated by the movement control operation of the user.

The movement control parameter may include: a location control parameter, an orientation control parameter, a speed control parameter, and the like of the virtual object.

In step S21, the client updates a location at a current speed of the virtual object according to the movement control parameter.

In step S22, the client sends, to a server, a movement control operation request carrying the movement control parameter.

Step S21 and step S22 may be performed simultaneously.

In step S23, the server updates a location and a speed of a virtual object according to the movement control parameter.

In step S24, after updating the speed and the location of the virtual object, the server generates a movement update synchronization packet, and sends the movement update synchronization packet to the client.

The movement update synchronization packet may include synchronization data, for example, an updated speed, location or orientation of the virtual object, or a time stamp updated by the server.

In step S25, the client updates a speed of the virtual object according to the movement update synchronization packet.

The client may update the speed by using information, for example, an updated speed, location, orientation of the virtual object or a time stamp updated by the server, indicated in the movement update synchronization packet.

It may be learned that, in addition to updating, according to the procedure shown in FIG. 2, the speed of the virtual object each time when the first system integration time reaches the preset speed update time, the client may further instantly and proactively update the speed of the virtual object when receiving the movement update synchronization packet sent by the server. In addition to updating, according to the procedure shown in FIG. 2, the location of the virtual object each time when the second system integration time reaches the preset location update time, the client may further instantly and proactively update the location of the virtual object when detecting the movement control operation of the user and based on the movement control parameter indicated by the movement control operation of the user.

When receiving the movement update synchronization packet, the client can instantly and proactively update the speed of the virtual object; however, when the client instantly and proactively updates the location of the virtual object, the client does not need to implement the updating based on the movement update synchronization packet. In an implementation, the client and the server may have a set of same virtual object location update logic or algorithm. The client and the server may independently update the location of the virtual object based on the same virtual object location update logic or algorithm and according to the movement control parameter; but the client needs to proactively update the speed of the virtual object after receiving the movement update synchronization packet of the server.

In addition to updating, according to the procedure shown in FIG. 2, the speed and the location of the virtual object each time when the system integration time reaches the preset location update time, the server may further instantly and proactively update the speed and the location of the virtual object when receiving the movement control operation request of the user and based on the movement control parameter indicated by the movement control operation request of the user.

The client may recalculate the first system integration time each time after updating the speed of the virtual object by using the method shown in FIG. 3. The client may recalculate the second system integration time each time after updating the location of the virtual object by using the method shown in FIG. 3. The server may recalculate the system integration time each time after updating the speed and the location of the virtual object by using the method shown in FIG. 3.

In an alternative manner, the client may alternatively update the location and the speed of the virtual object after receiving the movement update synchronization packet sent by the server instead of directly updating the location of the virtual object based on the detected movement control operation of the user.

In an alternative manner, a case in which the server generates the movement update synchronization packet is not limited to a case in which the movement control operation request of the user is received, and may also be a case in which the server updates, when detecting that a moving state of the virtual object in a virtual scenario such as a game switches, the location and the speed of the virtual object, generates the movement update synchronization packet and sends the movement update synchronization packet to the client. In this case, the client may update the speed of the virtual object based on the movement update synchronization packet, or simultaneously update the speed and the location based on the movement update synchronization packet.

Figure 4:
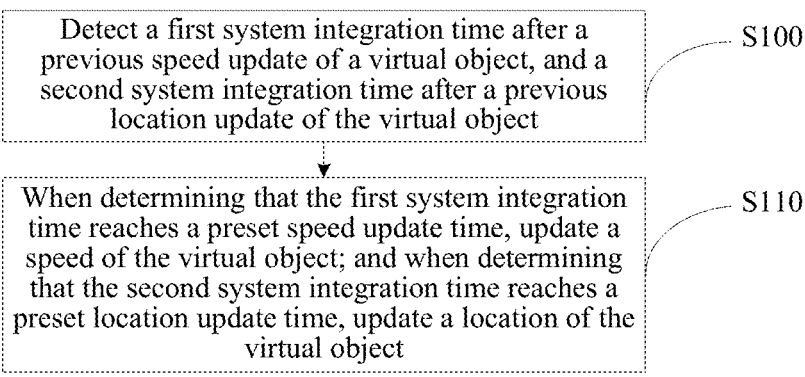
FIG. 4 shows a flowchart of a method for movement synchronization of a virtual object according to an embodiment of this disclosure.

From a perspective of a client, FIG. 4 is a flowchart of a method for movement synchronization of a virtual object according to an embodiment of this disclosure. The method may be performed by the client, and the client is, for example, a game client. Referring to FIG. 4, the method may include the following steps S100 and S110.

In step S100, detect a first system integration time after a previous speed update of a virtual object, and a second system integration time after a previous location update of the virtual object.

In step S110, when the first system integration time reaches a preset speed update time, update a speed of the virtual object; and when the second system integration time reaches a preset location update time, update a location of the virtual object.

The preset speed update time is greater than the preset location update time, the first system integration time may be recalculated each time after the client updates the speed of the virtual object, and the second system integration time may be recalculated each time after the client updates the location of the virtual object.

Because the preset speed update time is greater than the preset location update time, the client may update the speed of the virtual object at a relatively low frequency, and updates the location of the virtual object at a relatively high frequency.

Figure 5:
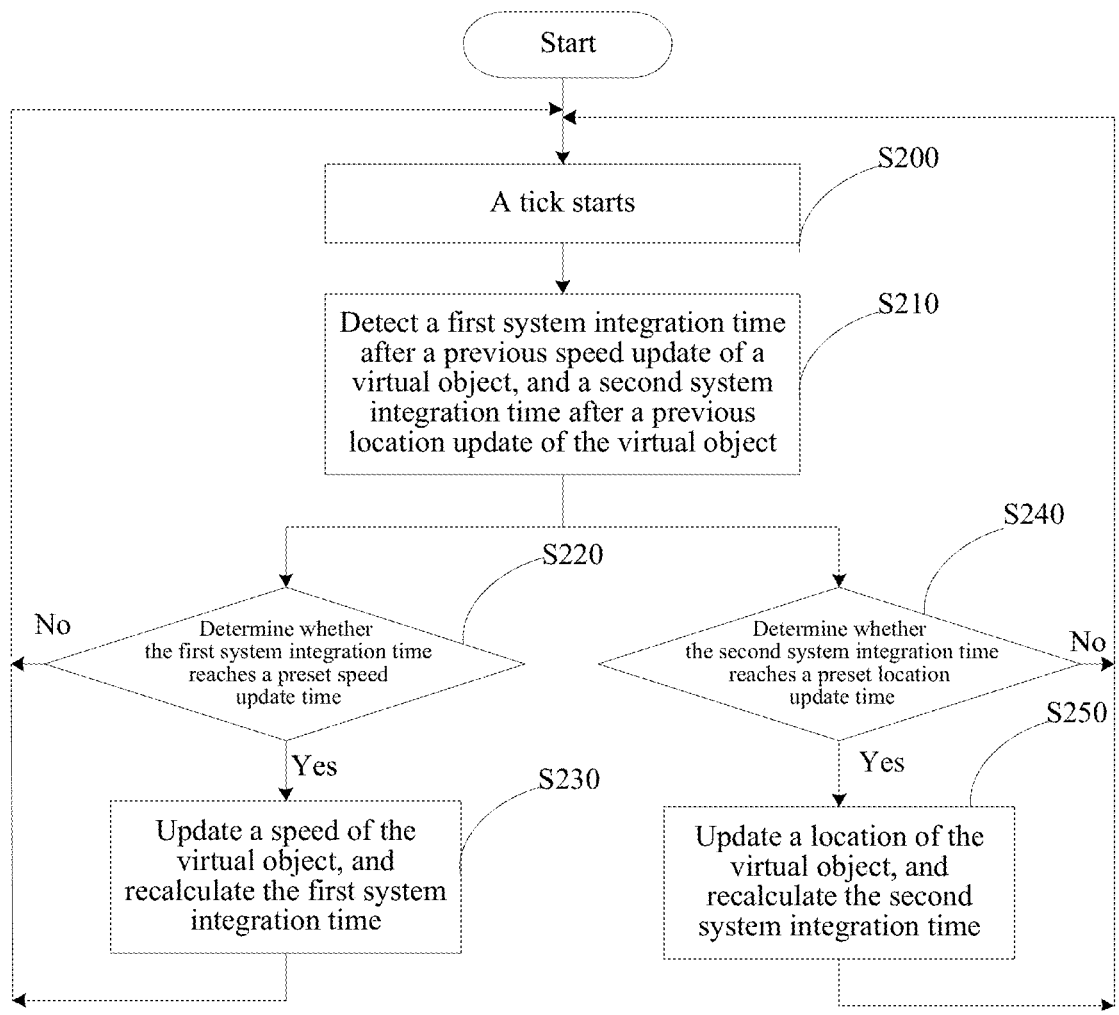
FIG. 5 shows a flowchart of a method for movement synchronization of a virtual object according to an embodiment of this disclosure.

In an implementation, the client may detect the first system integration time and the second system integration time each tick. Correspondingly, FIG. 5 is another flowchart of a method for movement synchronization of a virtual object according to an embodiment of this disclosure. The method may be performed by the client. Referring to FIG. 5, the method may include the following steps.

In step S200, a tick starts.

In step S210, detect a first system integration time after a previous speed update of a virtual object, and a second system integration time after a previous location update of the virtual object.

In step S220, determine whether the first system integration time reaches a preset speed update time, and if the first system integration time reaches the preset speed update time, perform step S230; or if the first system integration time does not reach the preset speed update time, return to step S200.

In step S230, update a speed of the virtual object, recalculate the first system integration time, and return to step S200.

In step S240, determine whether the second system integration time reaches a preset location update time, and if the second system integration time reaches the preset location update time, perform step S250; or if the second system integration time does not reach the preset location update time, return to step S200.

In step S250, update a location of the virtual object, recalculate the second system integration time, and return to step S200.

A tick is an optional period for performing the method shown in FIG. 5. In an embodiment, a tick can be a unit of time used by a terminal device. According to this embodiment of this disclosure, n ticks may be set as a period for performing the method shown in FIG. 5. To be specific, at an interval of n ticks, the client may detect the first system integration time after the previous speed update of the virtual object and the second system integration time after the previous location update of the virtual object; update the speed of the virtual object each time when the first system integration time reaches the preset speed update time, and update the location of the virtual object each time when the second system integration time reaches the preset location update time.

n may be an integer not less than 1.

When the speed of the virtual object is updated by using the method shown in FIG. 4, the client may determine a speed update trend (for example, a speed decrease or a speed increase) of the virtual object according to a movement update synchronization packet lastly sent by the server, and an acceleration value (for example, an acceleration value corresponding to a speed update within a time segment that is lastly set under the speed update trend) corresponding to the speed update trend, to update, according to the speed update trend and the acceleration value, the speed of the virtual object each time when the first system integration time reaches the preset speed update time.

If the movement update synchronization packet that is lastly sent by the server is triggered by an acceleration operation of the user, the speed update trend of the virtual object that is indicated by the movement update synchronization packet may be a speed increase, and a corresponding acceleration value triggered by the acceleration operation of the user is, for example, 3 m/s$^2$, so that the client may update the speed of the virtual object based on a current speed of the virtual object and the acceleration value of 3 m/s$^2$, when the first system integration time reaches the preset speed update time, and.

When the location of the virtual object is updated by using the method shown in FIG. 4, the client may determine a current location orientation and the current speed of the virtual object, to update the location of the virtual object by using the current location orientation and the current speed each time when the second system integration time reaches the preset location update time.

If the current speed the virtual object is, for example, 5 m/s, and the current location orientation is to run toward the north, when there is no user operation interference, the client may update the location of the virtual object toward the north at the speed of 5 m/s when the second system integration time reaches the preset location update time.

In addition to regularly updating the speed and the location of the virtual object by using the methods shown in FIG. 4 and FIG. 5, alternatively, the client may instantly and proactively update the location of the virtual object based on an operation of the user, or instantly and proactively update the speed of the virtual object based on a movement update synchronization packet fed back by the server.

Figure 6:
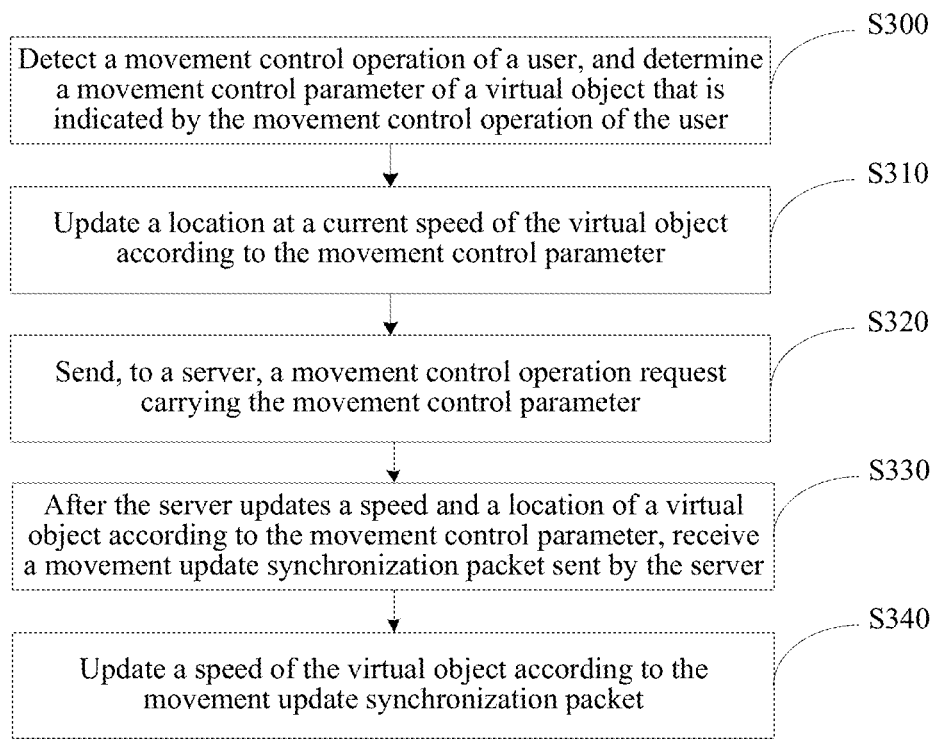
FIG. 6 shows a flowchart of a method for movement synchronization of a virtual object according to an embodiment of this disclosure.

FIG. 6 is still another flowchart of a method for movement synchronization of a virtual object according to an embodiment of this disclosure, and the method may be performed by the client. Referring to FIG. 6, the method may include the following steps.

In step S300, detect a movement control operation of a user, and determine a movement control parameter of a virtual object that is indicated by the movement control operation of the user.

The movement control parameter may include: a location control parameter, an orientation control parameter, a speed control parameter, and the like of the virtual object.

In step S310, update a location at a current speed of the virtual object according to the movement control parameter.

The current speed of the virtual object may be a corresponding speed of the virtual object when a location of the virtual object is currently updated.

Updating the location of the virtual object by the client at the current speed and according to the movement control parameter may be considered as a form in which the client updates the location of the virtual object. Based on the foregoing concept that the second system integration time is recalculated each time after the client updates the location of the virtual object, the client needs to recalculate the second system integration time after updating the location of the virtual object at the current speed and according to the movement control parameter, for example, zero out a current second system integration time and recalculate the second system integration time.

In step S320, send, to a server, a movement control operation request carrying the movement control parameter.

In step S330, after the server updates a speed and a location of a virtual object according to the movement control parameter, receive a movement update synchronization packet sent by the server.

The movement update synchronization packet may include synchronization data, for example, an updated speed, location or orientation of the virtual object, or a time stamp updated by the server.

In step S340, update a speed of the virtual object according to the movement update synchronization packet.

The client may update the speed by using information, for example, an updated speed, location, orientation of the virtual object or a time stamp updated by the server, indicated in the movement update synchronization packet. For example, the client may compare the time stamp updated by the server with a current time to determine a time difference, and determine, based on the updated speed, location, and orientation of the virtual object, a speed adjustment value of the virtual object that corresponds to the time difference, to update the speed of the virtual object on the client side based on the updated speed indicated by the movement update synchronization packet and the speed adjustment value.

In an implementation, network quality of the client and the server is good. If network delay is less than network delay, the client may update the speed of the virtual object by directly using the updated speed indicated in the movement update synchronization packet.

Updating the speed of the virtual object by the client according to the movement update synchronization packet is considered as a form in which the client updates the speed of the virtual object. Based on the foregoing concept that the first system integration time is recalculated each time after the client updates the speed of the virtual object, the client needs to recalculate the first system integration time after updating the speed of the virtual object according to the movement update synchronization packet, for example, zero out a current first system integration time and recalculate the first system integration time.

Figure 7:
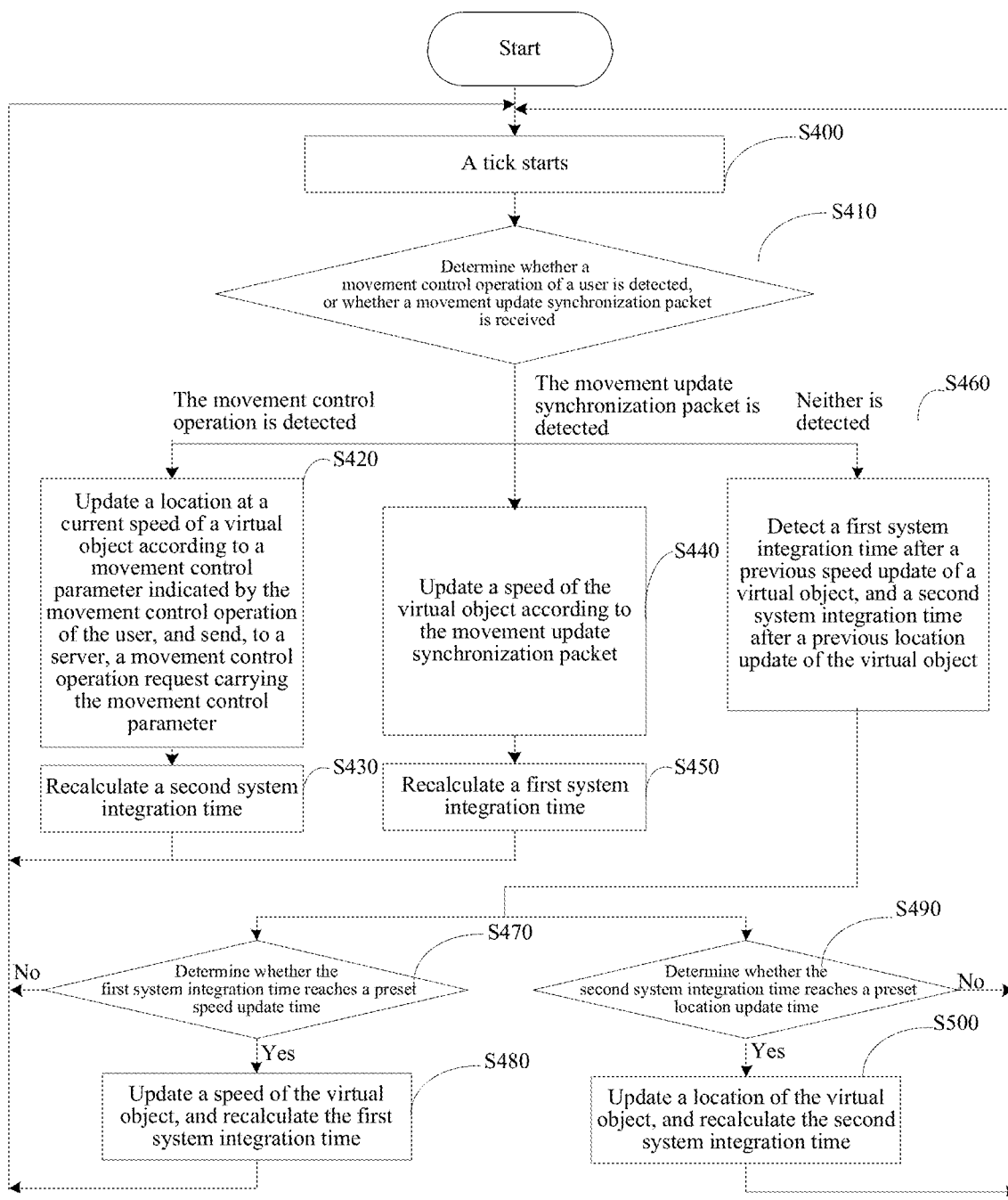
FIG. 7 shows a flowchart of a method for movement synchronization of a virtual object according to an embodiment of this disclosure.

With reference to the method shown in FIG. 5, at an interval of a tick, a client may detect whether the movement control operation of the user exists. Correspondingly, FIG. 7 is yet another flowchart of a method for movement synchronization of a virtual object according to an embodiment of this disclosure, and the method may be performed by the client. Referring to 7, the method may include the following steps.

In step S400, a tick starts.

In step S410, determine whether a movement control operation of a user is detected, or whether a movement update synchronization packet sent by a server is received; and if the movement control operation of the user is detected, perform Step S420, if the movement update synchronization packet is detected, perform Step S440, or if neither the movement control operation of the user nor the movement update synchronization packet is detected, perform Step S460.

In step S420, update a location at a current speed of a virtual object according to a movement control parameter indicated by the movement control operation of the user, and send, to the server, a movement control operation request carrying the movement control parameter.

In step S430, recalculate a second system integration time, and return to Step S400.

In step S440, update a speed of the virtual object according to the movement update synchronization packet.

In step S450, recalculate a first system integration time, and return to Step S400.

In step S460, detect a first system integration time after a previous speed update of a virtual object, and a second system integration time after a previous location update of the virtual object.

In step S470, determine whether the first system integration time reaches a preset speed update time, and if the first system integration time reaches the preset speed update time, perform step S480; or if the first system integration time does not reach the preset speed update time, return to step S400.

In step S480, update a speed of the virtual object, recalculate the first system integration time, and return to step S400.

In step S490, determine whether the second system integration time reaches a preset location update time, and if the second system integration time reaches the preset location update time, perform step S500; or if the second system integration time does not reach the preset location update time, return to step S400.

In step S500, update a location of the virtual object, recalculate the second system integration time, and return to step S400.

According to this embodiment of this disclosure, if neither the movement control operation of the user nor the movement update synchronization packet sent by the server exists, the client may perform updating by using different frequencies according to different requirements on updating of the speed and the location of the virtual object. The speed of the virtual object is updated by the client at a low frequency indicated by the server. To be specific, each time when the first system integration time reaches the preset speed update time, the client updates the speed of the virtual object once. The location of the virtual object is updated by the client at a high frequency. To be specific, each time when the second system integration time reaches the preset location update time, the client updates the location of the virtual object once, and the preset location update time is less than the preset speed update time.

However, when the movement control operation of the user and the movement update synchronization packet sent by the server exist, the client may proactively and instantly update the speed and the location of the virtual object, to ensure timeliness of updating the speed and the location of the virtual object.

According to this embodiment of this disclosure, updating of the speed and the location of the virtual object meets an actual operating requirement of a virtual scenario, a movement synchronization effect with a relatively high accuracy is achieved, and performance overhead of the server is greatly reduced.

Figure 8:
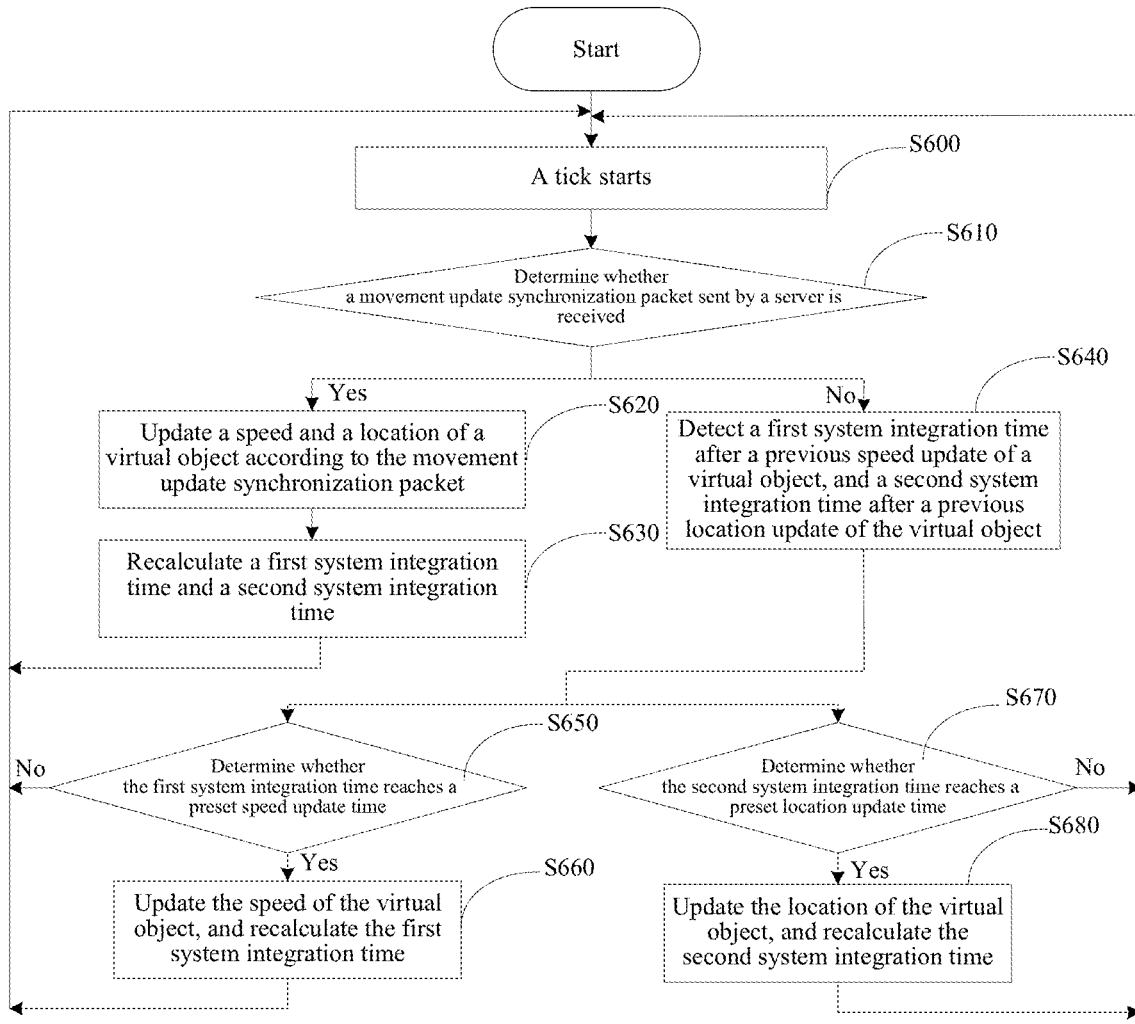
FIG. 8 shows a flowchart of a method for movement synchronization of a virtual object according to an embodiment of this disclosure.

In an alternative, a client may update a speed and a location of a virtual object when receiving a movement update synchronization packet sent by a server. Correspondingly, FIG. 8 is still yet another flowchart of a method for movement synchronization of the virtual object according to an embodiment of this disclosure, and the method may be performed by the client. Referring to FIG. 8, the method may include the following steps.

In step S600, a tick starts.

In step S610, determine whether a movement update synchronization packet sent by a server is received, and if the movement update synchronization packet sent by the server is received, perform step S620, or if the movement update synchronization packet sent by the server is not received, perform step S640.

The movement update synchronization packet may be generated based on a movement control operation of a user. For example, after detecting the movement control operation of the user, the client may send a corresponding movement control operation request to the server; after updating a speed and a location of a virtual object based on the movement control operation request, the server may generate the movement update synchronization packet indicating information such as an updated speed, location, orientation of the virtual object or a time stamp updated by the server, and send the movement update synchronization packet to the client.

Alternatively, the movement update synchronization packet may be generated based on switch of a moving state of the virtual object. After detecting that the moving state of the virtual object switches in a virtual scenario, the server may update the speed and the location of the virtual object, generate the movement update synchronization packet, and send the movement update synchronization packet to the client.

In step S620, update a speed and a location of a virtual object according to the movement update synchronization packet.

The client may update the speed and the location by using information, for example, the updated speed, location, or orientation of the virtual object, or the time stamp updated by the server, indicated in the movement update synchronization packet.

If a time difference between a current time of the client and the time stamp updated by the server is determined, a speed adjustment value of the virtual object that corresponds to the time difference is determined based on the updated speed, location, and orientation of the virtual object, so that the speed of the virtual object is updated on the client side based on the updated speed indicated by the movement update synchronization packet and the speed adjustment value. Meanwhile, a location adjustment value of the virtual object that corresponds to the time difference is determined based on the updated speed, location, and orientation, so that the location of the virtual object is updated on the client side based on the updated location indicated by the movement update synchronization packet and the location adjustment value.

In an implementation, when network quality of the client and the server is good, the client may alternatively update the speed of the virtual object by directly using the updated speed indicated in the movement update synchronization packet, and update the location of the virtual object by using the updated location indicated in the movement update synchronization packet.

In step S630, recalculate a first system integration time and a second system integration time, and return to step S600.

In step S640, detect a first system integration time after a previous speed update of a virtual object, and a second system integration time after a previous location update of the virtual object.

In step S650, determine whether the first system integration time reaches a preset speed update time, and if the first system integration time reaches the preset speed update time, perform step S660; or if the first system integration time does not reach the preset speed update time, return to step S600.

In step S660, update the speed of the virtual object, recalculate the first system integration time, and return to step S600.

In step S670, determine whether the second system integration time reaches a preset location update time, and if the second system integration time reaches the preset location update time, perform step S680; or if the second system integration time does not reach the preset location update time, return to step S600.

In step S680, update the location of the virtual object, recalculate the second system integration time, and return to step S600.

Figure 9:
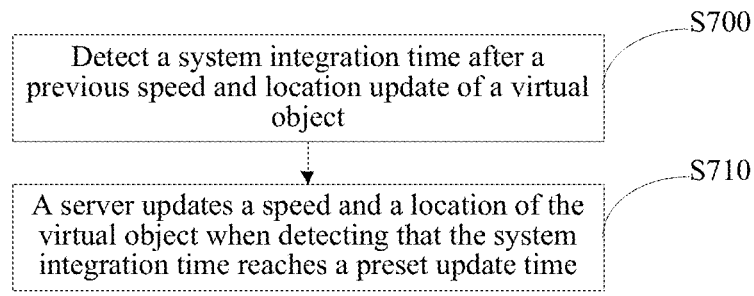
FIG. 9 shows a flowchart of a method for movement synchronization of a virtual object according to an embodiment of this disclosure.

From a perspective of a server, FIG. 9 is a further flowchart of a method for movement synchronization of a virtual object according to an embodiment of this disclosure, and the method may be performed by the server. The server may be a game server. Referring to FIG. 9, the method may include the following steps S700 and S710.

In step S700, detect a system integration time after a previous speed and location update of a virtual object.

The system integration time is recalculated each time after the server updates a speed and a location of the virtual object.

In step S710, the server updates a speed and a location of the virtual object when detecting that the system integration time reaches a preset update time.

The preset update time may be consistent with the preset speed update time used by the foregoing client. To be specific, frequencies at which the server updates the speed and the location of the virtual object are consistent, both the speed and the location are updated at a low frequency, and the frequency at which the server updates the speed and the location is consistent with a low frequency at which the client updates a speed; and the system integration time is recalculated each time after the server updates the speed and the location of the virtual object.

In an implementation, the server may detect the system integration time once at an interval of n ticks, where n is an integer equal to or greater than 1. Specifically, at an interval of a tick, the server may detect the system integration time after the previous speed and location update of the virtual object, updates the speed and the location of the virtual object when detecting that the system integration time reaches the preset update time, and recalculate the system integration time.

Alternatively, the server may instantly and proactively update the speed and the location of the virtual object based on a movement control operation of a user.

Figure 10:
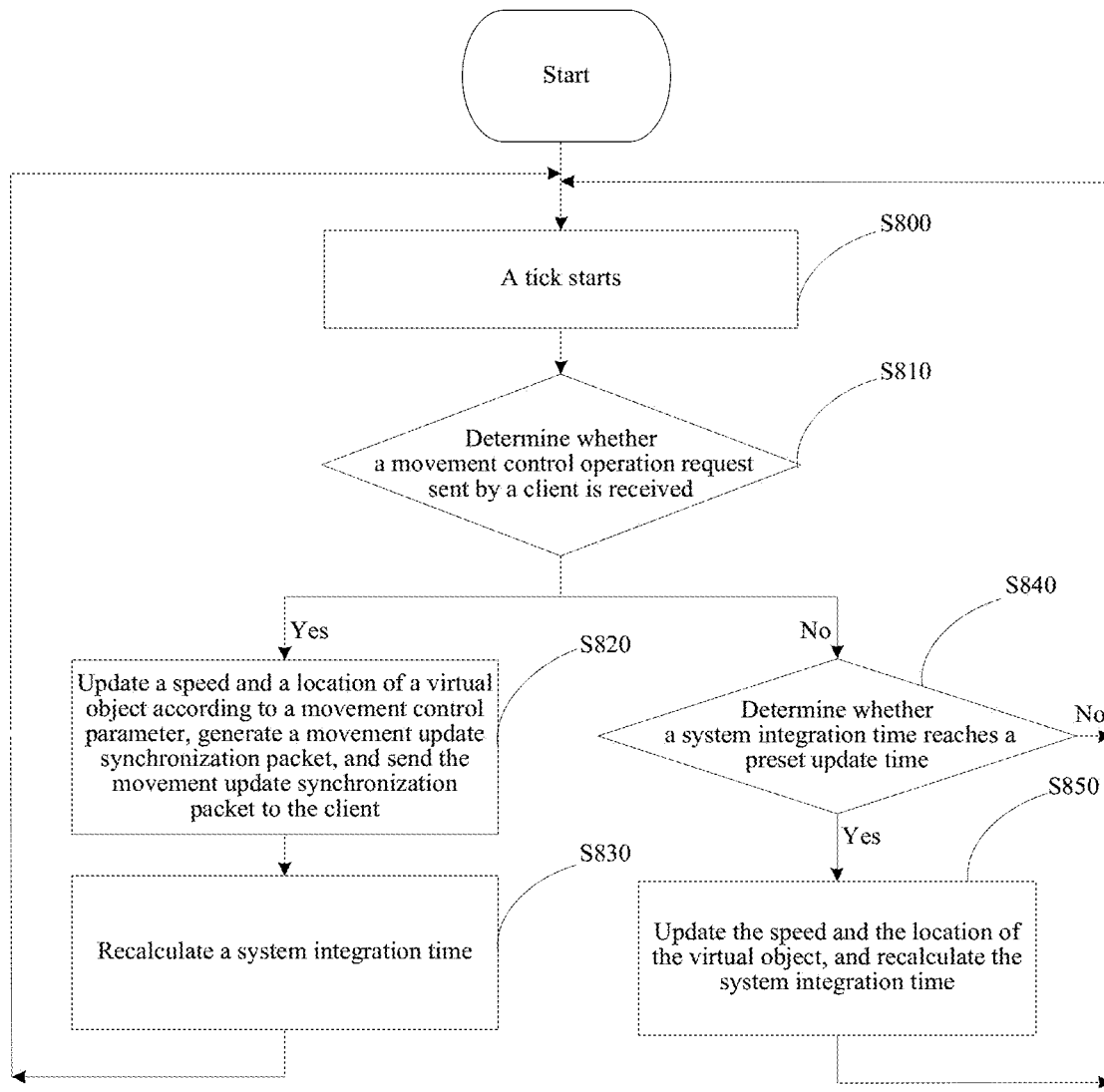
FIG. 10 shows a flowchart of a method for movement synchronization of a virtual object according to an embodiment of this disclosure.

FIG. 10 is a still further flowchart of a method for movement synchronization of a virtual object according to an embodiment of this disclosure, and the method may be performed by a server. Referring to FIG. 10, the method may include the following steps.

In step S800, a tick starts.

In step S810, determine whether a movement control operation request sent by a client is received, where the movement control operation request carries a movement control parameter, and if the movement control operation request sent by the client is received, perform step S820, or if the movement control operation request sent by the client is not received, perform step S840.

In step S820, update a speed and a location of a virtual object according to the movement control parameter, generate a movement update synchronization packet, and send the movement update synchronization packet to the client.

In step S830, recalculate a system integration time, and return to Step S800.

In step S840, determine whether a system integration time after a previous speed and location update of the virtual object reaches a preset update time, and if the system integration time reaches the preset update time, perform step S850, or if the system integration time does not reach the preset update time, return to Step S800.

In step S850, update the speed and the location of the virtual object, recalculate the system integration time, and return to step S800.

Alternatively, the server may update the speed and the location of the virtual object when detecting switch of a moving state of the virtual object, generate the movement update synchronization packet, and send the movement update synchronization packet to the client. The server may detect whether the moving state of the virtual object switches each tick; and if the moving state switches, update the speed and the location of the virtual object, generate the movement update synchronization packet and send the movement update synchronization packet to the client, and meanwhile, recalculate the system integration time, and wait for a next tick; or if the moving state does not switch, determine whether the system integration time reaches the preset update time; and when the system integration time reaches the preset update time, update the speed and the location of the virtual object, and recalculate the system integration time and wait for a next tick; or when the system integration time does not reach the preset update time, wait for a next tick.

According to this embodiment of this disclosure, when there is no the movement control operation request of a user and the moving state of the virtual object does not switch, considering performance overhead, the server may update the speed and the location of the virtual object at a relatively low frequency. To be specific, the server updates the speed and the location of the virtual object each time when the system integration time reaches the preset update time. Moreover, the frequency at which the server updates the speed and the location of the virtual object is consistent with a frequency at which the client updates a speed of the virtual object without a movement control operation of the user and without the movement update synchronization packet.

However, if the movement control operation request of the user exists or the moving state of the virtual object switches, the client may proactively and instantly update the speed and the location of the virtual object, to ensure timeliness of updating the speed and the location of the virtual object.

According to this embodiment of this disclosure, the performance overhead of the server may be greatly reduced on the basis of achieving a movement synchronization effect with a relatively high accuracy.

Figure 11:
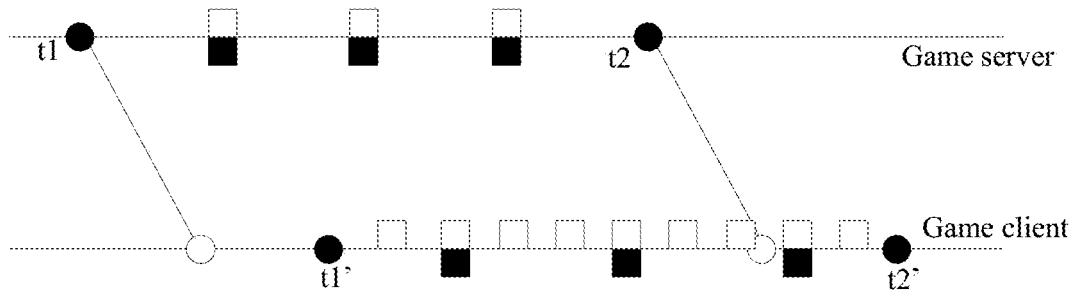
FIG. 11 shows a schematic diagram of movement update timelines of a client and a server according to an embodiment of this disclosure.

With reference to perspectives of a client and a server, FIG. 11 is a schematic diagram of movement update timelines of the client and the server according to an embodiment of this disclosure. In FIG. 11, black dots represent time points at which the client and the server proactively and instantly update a speed and a location, for example, time points at which the client and the server updates the speed and the location based on an operation of a user; a white dot represents a time point at which the client receives a movement update synchronization packet; black rectangular points represent time points at which the client and the server updates the speed at a low frequency; and white rectangular points represent a time point at which the client updates the location at a high frequency and a time point at which the server updates the location at a low frequency.

In FIG. 11, the server updates the speed at a time t1, which may be caused by a user operation, or may be caused by switch of a moving state of a virtual object. Updating of the speed by the server needs to be synchronized to the client, and the client may update the speed at a corresponding time t1' of the timeline. A situation at a time t2 is similar to the situation at the time t1.

Figure 12:
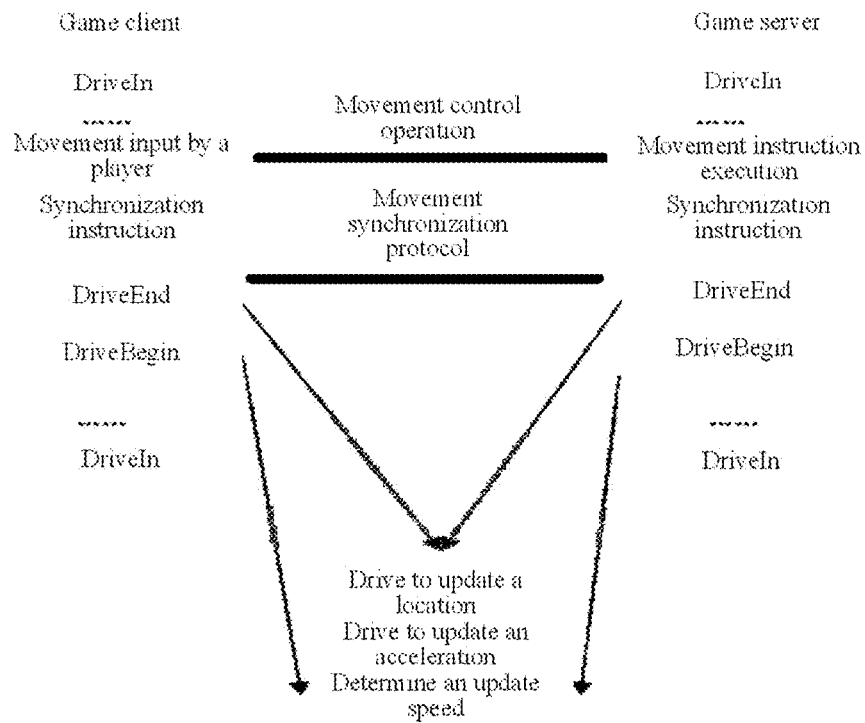
FIG. 12 shows a schematic diagram of components of a game client and a game server according to an embodiment of this disclosure.

FIG. 12 is a schematic diagram of components of a game client and a game server according to an embodiment of this disclosure. Referring to FIG. 12, a DriveIn on the client side is configured to: calculate a first system integration time and a preset speed update time, and if the first system integration time reaches the preset speed update time, perform a speed update. Meanwhile, the DriveIn on the client side is further configured to: calculate a relationship between a second system integration time and a preset location update time, and if the second system integration time reaches the preset location update time, perform a location update. Both DriveEnds on the client side and on the server side may be configured to perform a location update. Both DriveBegins on the client side and on the server side may be configured to perform a speed update. When the DriveIn is satisfied, the client and the server may use a same set of logic to perform a speed update and a location update. However, a frequency at which the client updates the location is a high frequency, and a frequency at which the client updates the speed and a frequency at which the server updates the speed and the location are all a same low frequency.

With reference to FIG. 11, the DriveIn process speed and location updates at the rectangular points (black or white). The client receives a movement update synchronization packet of the server at a time t2', first calculates a displacement and a speed change within a period of time from a previous DriveIn to t2', and then calculates a new moving speed by using a movement parameter in the movement update synchronization packet. This is a job of the DriveBegin. When it is ensured that results output by the server and the client after updating at the black dots and black rectangular points in the figure are the same, even if frequencies at which the client and the server performing the location updates at the white rectangular points are different, moving representations of the client and the server are highly consistent, and a good movement synchronization effect is achieved, to obtain a movement synchronization effect with a relatively high accuracy.

A low frequency at which the server updates the speed and the location of the virtual object and a high frequency at which the client updates the location of the virtual object may differ by a preset times. To be specific, a preset update time for updating the speed and the location by the server may be a preset times of a preset location update time of the client. The preset times may be defined according to actual running of a virtual scenario such as a game, for example, three times to eight times. In an implementation, the preset times is six times. In this embodiment of this disclosure, the preset times may optionally be a natural number greater than 3.

For example, a low frequency is 100 ms, and a high frequency is 16 ms. To be specific, the preset speed update time and the preset update time are 100 ms, and the preset location update time is 16 ms. To be specific, when neither a movement control operation of a user nor a movement synchronization packet exists, the client may update the location of the virtual object once at an interval of 16 ms, and update the speed of virtual object once at an interval of 100 ms. The location update frequency is about six times of the speed update frequency. When there is no movement control operation request of the user and a moving state of the virtual object does not switch, the server may update the speed and the location of the virtual object once at an interval of 100 ms.

Optionally, the server may specify low frequencies according to different requirements of the virtual object. For example, a low frequency corresponding to a game character controlled by a player is 50 ms, a low frequency corresponding to a logical object is 100 ms, and a low frequency corresponding to an AI object is 120 ms.

The foregoing specific numbers are optional forms, and do not limit the protection scope of this disclosure.

Figure 13:
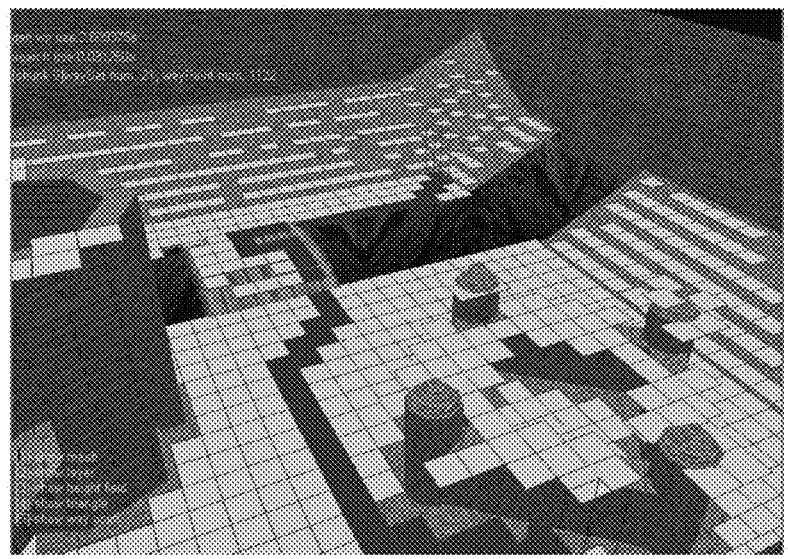
FIG. 13 shows a simulated movement synchronization solution based on 2D grids in the related technology.

The method for movement synchronization of a virtual object in the embodiments of this disclosure may be applied to a game scenario. A virtual scenario may be a game scenario, a virtual object is a game object, and a game is, for example, a 2D (two-dimensional) game or a 3D (three-dimensional) game. In the related technology, movement synchronization of the game object in the 3D game is mainly simulated and implemented by using 2D grids plus a height map. FIG. 13 is a simulated movement synchronization solution based on 2D grids in the related technology. It can be learned from FIG. 13 that, in the related technology, a 3D scenario is 2D meshed, and possibility for an unobstructed movement is calculated by using connectivity between grids. Such simulation limits a complex 3D scenario. For example, movement synchronization of the game object under a complex situation, such as dynamic blockage, cannot be successfully implemented.

In this embodiment of this disclosure, both the game client and the game server may control movement of the game object in the 3D game scenario by using character controllers, and update a speed and a location of the game object based on the character controllers. For example, the game server may update the location and the speed at a low frequency and based on the character controller, or the game server may update the speed and the location based on character controller when a movement control operation request exists or a moving state of the game object switches; meanwhile, the game client may update, based on character controller, the location at a high frequency, and update the speed at a low frequency, or the game client may update the speed and the location based on character controller when a the movement control operation of a user or a movement update synchronization packet exists. Character Controller is referred to as the character controller, and is a technology in which movement, collision, and interaction of a character in a 3D physical world is simulated.

According to this embodiment of this disclosure, during creation of the virtual scenario in a 3D form, both configuration and export of a scenario resource can be implemented by using a scenario editor. The scenario editor is a tool that is developed in a procedure of developing a virtual scenario such as a game and that is configured to edit the virtual scenario. The scenario editor may be edited by an art designed and a planner, to develop a 3D scenario used in the virtual scenario. 3D scenario data exported from the scenario editor is finally uploaded and used by the client (for example, the game client) and the server (for example, the game server) when the virtual scenario runs.

Figure 14:
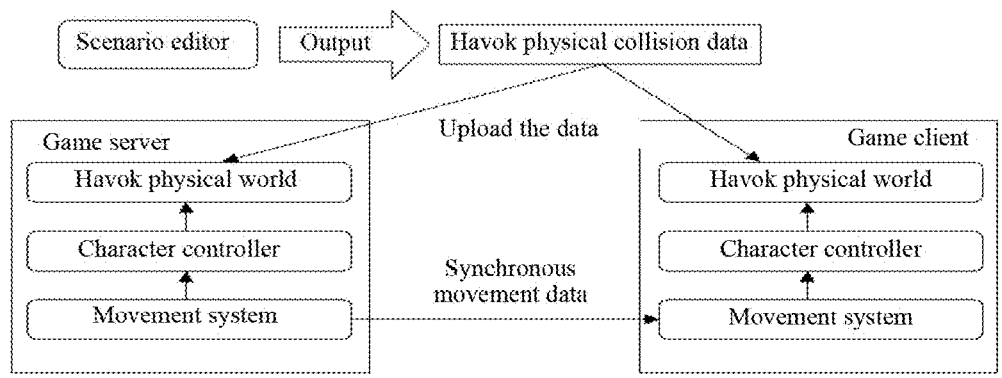
FIG. 14 shows a schematic diagram of interaction of a scenario editor with a game client and a game server according to an embodiment of this disclosure.

In this embodiment of this disclosure, after a 3D scenario of the scenario editor is created, the scenario editor may export same topographic walking layer data of the 3D scenario, physical collision data of a static object in the 3D scenario, physical collision data of a dynamic object in the 3D scenario, and the like to the client (for example, the game client) and the server (for example, the game server). FIG. 14 is a schematic diagram of a relationship between the scenario editor and the game client and the game server.

Using a virtual game scenario as an example, the game client may receive topographic walking layer data of a 3D scenario, physical collision data of a static object in the 3D scenario, and physical collision data of a dynamic object in the 3D scenario that are exported from the scenario editor and that are also received by the game server. The game server may receive the topographic walking layer data of the 3D scenario, the physical collision data of the static object in the 3D scenario, and the physical collision data of the dynamic object in the 3D scenario that are exported from the scenario editor and that are also received by the game client.

The physical collision data is data of a physical rigid body that is exported from model mesh data of an object having a collision attribute, such as a topography or an object. For example, a model of a box is a cuboid, and data that is generated when a physical rigid body generated based on the cuboid represents the box and participates in movement collision is the physical collision data.

Figure 15:
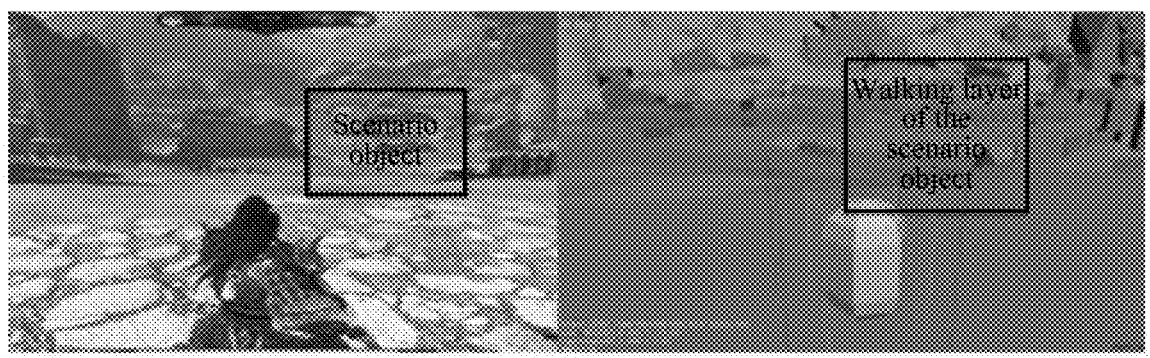
FIG. 15 shows a schematic diagram of physical collision data of a static object in a 3D scenario according to an embodiment of this disclosure.
Figure 16:
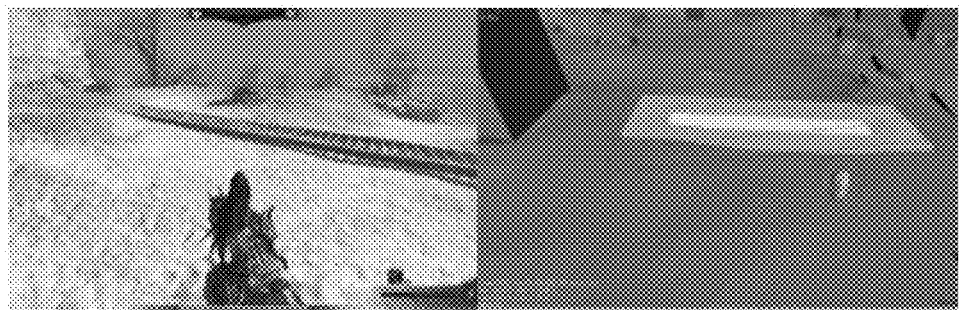
FIG. 16 shows a schematic diagram of physical collision data of a dynamic object in a 3D scenario according to an embodiment of this disclosure.

FIG. 15 is a schematic diagram of the physical collision data of the static object in the 3D scenario, and FIG. 16 is a schematic diagram of the physical collision data of the dynamic object in the 3D scenario. In FIG. 15, the static object is a stationary object in the scenario, such as a stone, and the physical collision data of the static object is physical collision data when the static object participates in the movement collision. In FIG. 15, a frame on the left represents a model of the stone, and a frame on the right represents the physical collision data corresponding to the stone. In FIG. 16, the dynamic object is an object that can move relative to the static object and that has logical behavior. In FIG. 16, a frame on the left represents a model of a scaling ladder, and a frame on the right represents physical collision data corresponding to the scaling ladder.

Figure 17:
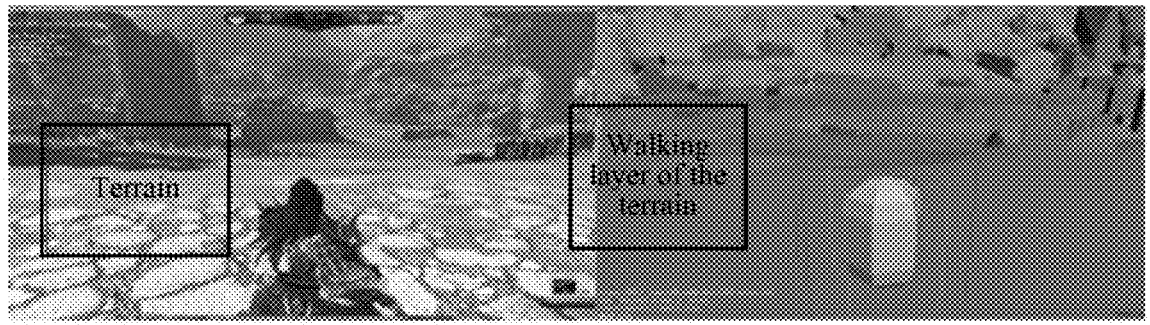
FIG. 17 shows a schematic diagram of topographic walking layer data in a 3D scenario according to an embodiment of this disclosure.

The topographic walking layer data is data of a physical rigid body that is generated based on mesh data of a terrain, and represents data that is generated when a ground participates in the movement collision. FIG. 17 is a schematic diagram of the topographic walking layer data in the 3D scenario. In FIG. 17, a frame on the left represents a terrain model, that is, an expression of the terrain in the game, and a frame on the right represents the physical collision data corresponding to the terrain, that is, a physical model when the terrain participates in the movement collision.

According to this embodiment of this disclosure, based on that, for different update requirements on the speed and the location of the virtual object, the speed and the location are updated by using different frequencies, the speed and the location of the virtual object may be updated by using character controllers. Moreover, the server and the client have the same topographic walking layer data of the 3D scenario, the same physical collision data of the static object in the 3D scenario, the same physical collision data of the dynamic object in the 3D scenario, and the like that are edited by the scenario editor. By means of such setting, according to this embodiment of this disclosure, it may be ensure that a movement synchronization effect has relatively high accuracy, performance overhead of the server is reduced, and resolve a movement synchronization requirement in the 3D scenario under a complex situation, to implement movement synchronization of the virtual object based on a 3D scenario of a real physical collision.

Figure 18:
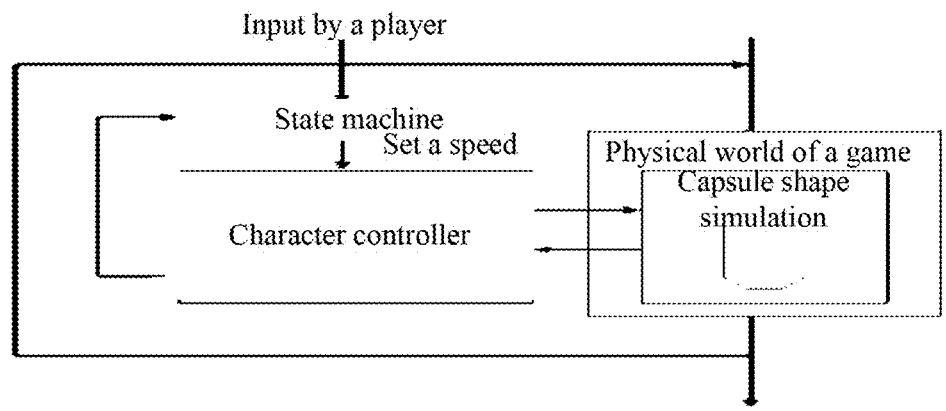
FIG. 18 shows a schematic diagram of a movement model based on a character controller according to an embodiment of this disclosure.

In this embodiment of this disclosure, the character controller is a movement model of the virtual object in the 3D scenario that is simulated by a bottom layer. The client and the server use the same character controllers. Based on the character controller, the movement model of the virtual object may be defined in this embodiment of this disclosure. In this embodiment of this disclosure, the movement model of the virtual object may be implemented by using a shape, such as a capsule shape, a rounded capsule shape, and the like. To be specific, movement of the virtual object is simulated by using the shape. According to this embodiment of this disclosure, when the client or the server detects that a speed or a location of a virtual object needs to be updated (including a situation of instant and proactive update and a situation of regular update at a high frequency or at a low frequency), a character controller of the virtual object in the client or the server may calculate a new speed or location of the virtual object; during each speed or location update, may perform linear cast processing on a movement model of the virtual object, to proactively query the speed or location of the virtual object in a physical world of the virtual scenario such as a game, to update the speed or location of the virtual object; and meanwhile, may maintain moving state logic of the character controller by using a state machine. FIG. 18 is a schematic diagram of a movement model based on a character controller.

Figure 19:
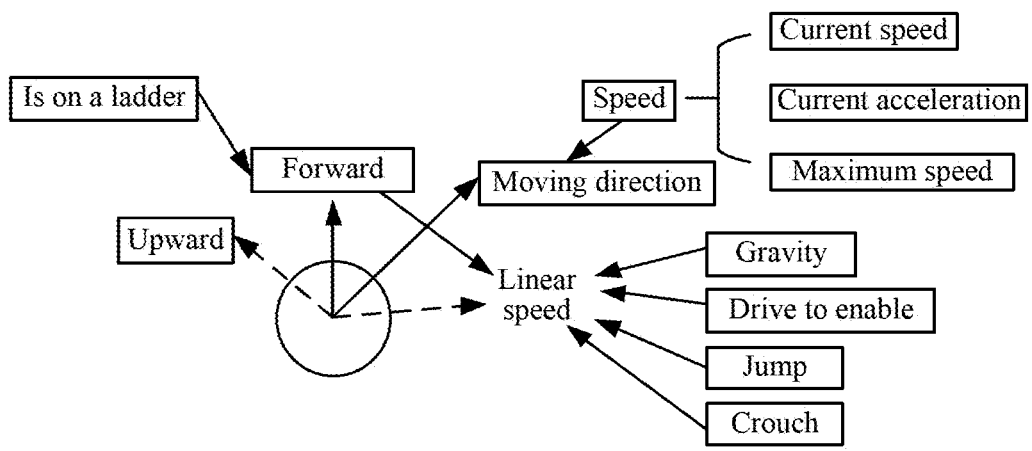
FIG. 19 shows a schematic diagram of an infantryman movement model according to an embodiment of this disclosure.
Figure 21:
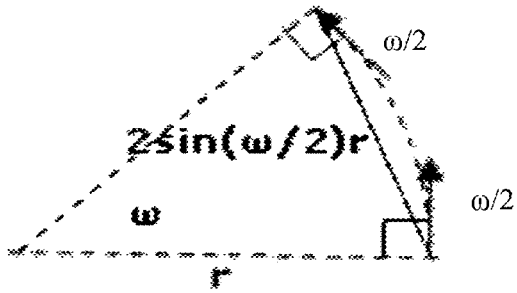
FIG. 21 shows a schematic diagram of an angular speed simulated by using a linear speed according to an embodiment of this disclosure.
Figure 22:
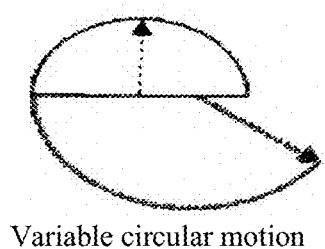
FIG. 22 shows a schematic diagram of a variable circular motion according to an embodiment of this disclosure.

Using a ridding and cutting game as an example, to implement real and abundant movement expressions while ensuring stability of a whole movement model, in this embodiment of this disclosure, based on a Havok engine, an extensible character controller may be used to define movement models of an infantryman and a rider; and different parameter combinations and settings are defined by using the movement models of the infantryman and the rider, so that the movement model of the infantryman may support constant-speed or variable-speed rectilinear motion in any direction, the movement model of the rider may support circular motion or variable circular motion (an angular speed simulated by using a linear speed), and the defined movement models are asymmetric movement collision models. FIG. 19 shows the defined infantryman movement model, FIG. 20 shows the defined rider movement model, FIG. 21 is a schematic diagram of the angular speed simulated by using the linear speed, and FIG. 22 is a schematic diagram of the variable circular motion.

Figure 20:
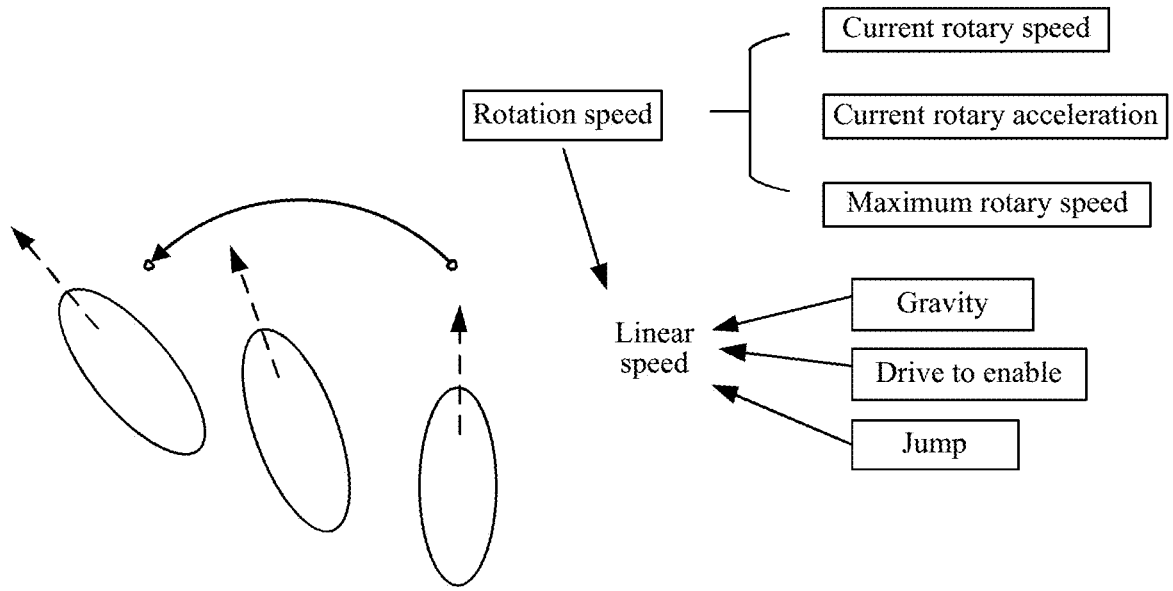
FIG. 20 shows a schematic diagram of a rider movement model according to an embodiment of this disclosure.

Based on the extensible character controller, for any new movement requirement, required parameters are selected from combined movement parameters according to an actual requirement and are synchronized to the client without changing a bottom-layer algorithm of movement synchronization of the client or the server, and the combined movement parameters are parameters shown in blocks in FIG. 19 and FIG. 20.

To resolve a problem that, in a complex network environment, movement pull of the virtual object may occur to the movement synchronization between the client and the server, in this embodiment of this disclosure, a buffer duration may be set on the client side, to mitigate movement nonsynchronization of the virtual object between the client and the server that is caused by network fluctuation.

Figure 23:
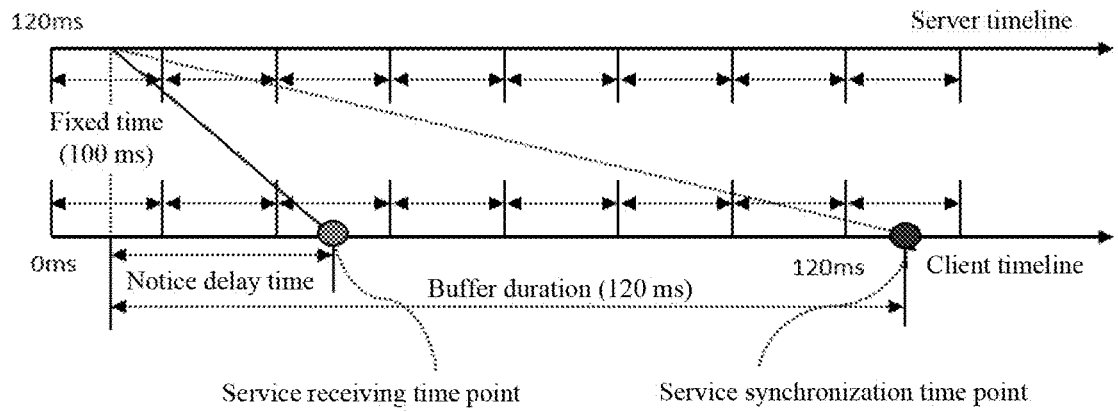
FIG. 23 shows a schematic diagram of movement update timelines of a client and a server according to an embodiment of this disclosure.

As shown in FIG. 23, the buffer duration is buffer duration in which the server and the client perform movement synchronization of the virtual object; a fixed time represents a stable update time; a notice delay time represents a response delay (because a network is complex, the response delay is dynamically unpredictable) of the client to the server; and a service receiving time point represents a time point at which the client receives a movement update synchronization packet of the server.

Under normal conditions, the buffer duration is greater than the notice delay time. Therefore, a service synchronization time point of the client can be implemented after the service receiving time point. This case is healthy, and a result of the movement synchronization of the virtual object between the client and the server is the best. However, network environment can be complex, and performance of the client is also very different from that of the server. Consequently, the buffer duration may be not greater than the notice delay time, and the service synchronization time point is passed when the client implements the service receiving time point. In this case, the client needs to update a current first system time and a current second system time, and recalculate the first system time and the second system time.

Specifically, the client may determine the response delay between the client and the server, and if a preset buffer duration is greater than the response delay, determine that processing of the movement synchronization of the virtual object is normal. If the preset buffer duration is less than the response delay, the client may recalculate the first system time and the second system time, to ensure normal processing of subsequent movement synchronization.

Because factors exist, such as a unstable network, for network games that are subject to a moving state update result of the virtual object calculated by the server, movement pull phenomena of the virtual object inevitably occurs. In this case, to ensure a locally smooth behavior of the client, when a difference between a first update location of the virtual object that is locally determined by the client and a second update location of the virtual object that is indicated in the movement update synchronization packet of the server is relatively large (for example, the location difference is greater than a preset location difference), the client may linearly move, in multiple set frames, the virtual object from the first update location of the virtual object to the second update location of the virtual object.

For example, the update location of the virtual object calculated by the client is x1, and the update location of the virtual object indicated in the movement update synchronization packet of the server is x2. When x2 is much greater than x1, and the location different is greater than the preset location difference, to ensure the smooth behavior of the client, the client may linearly move, in multiple future frames, the virtual object from the location x1 to the location x2.

In this embodiment of this disclosure, alternatively, a manner in which the server believes a location calculation result of the client to some extent is used to further reduce performance overhead of the server. Correspondingly, the client may report a determined update location of the virtual object to the server. The server may determine a location difference between the update location of the virtual object reported by the client and a location of the virtual object that is lastly determined by the server. When the determined location difference is less than a preset location threshold, the server can believe the update location of the virtual object reported by the client, and the server may update a location of the virtual object to the update location reported by the client.

Figure 24:
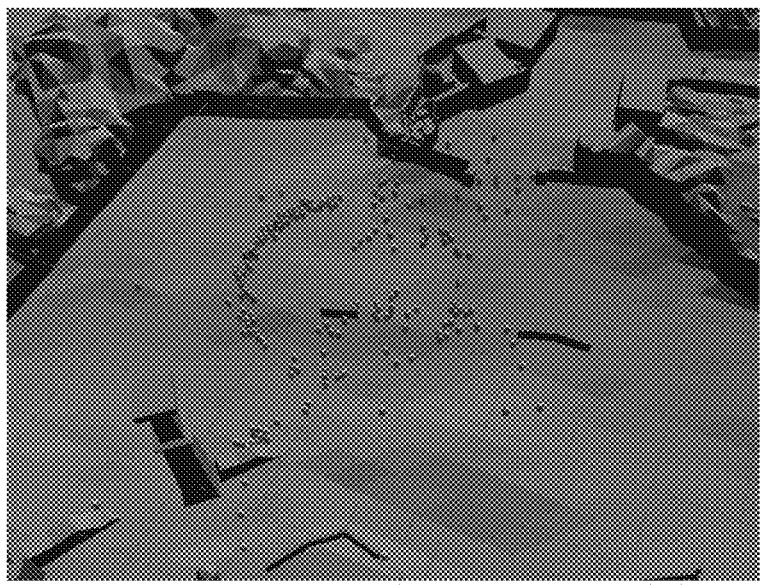
FIG. 24 shows a schematic diagram illustrating that a game can support movement simulation and movement synchronization of multiple objects in a 3D scenario according to an embodiment of this disclosure.

In a comparison example, after the method for movement synchronization of a virtual object provided in this embodiment is implemented, overhead of the movement synchronization occupies less than 5% of a single core of a CPU on the server end, and a single map server may support thousands of players in fighting simultaneously. FIG. 24 is a schematic diagram illustrating that a game can support movement simulation and movement synchronization of multiple objects in a 3D scenario. After the method for movement synchronization of a virtual object provided in this embodiment of this disclosure is implemented, because performance overhead of a server is relatively low, and the accuracy of a movement synchronization effect between the server and a client is relatively high, the game may support movement simulation and movement synchronization of multiple objects in a 3D scenario. Spheres in the figure represent virtual objects.

A client according to an embodiment of this disclosure is described below, and cross-reference may be made between the following descriptions and content of the foregoing method procedure accordingly.

Figure 25:
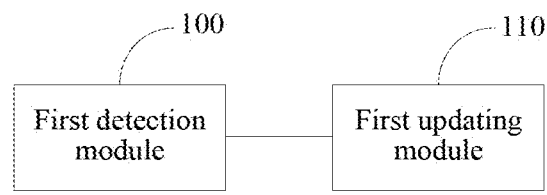
FIG. 25 shows a structural block diagram of a client according to an embodiment of this disclosure.

FIG. 25 is a structural block diagram of a client according to an embodiment of this disclosure. Referring to FIG. 25, the client may include:

a first detection module 100, configured to detect a first system integration time after a previous speed update of a virtual object, and a second system integration time after a previous location update of the virtual object; and a first updating module 110, configured to: when the first system integration time reaches a preset speed update time, update a speed of the virtual object; and when the second system integration time reaches a preset location update time, update a location of the virtual object.

The preset speed update time is greater than the preset location update time, the first system integration time is recalculated each time after the client updates the speed of the virtual object, and the second system integration time is recalculated each time after the client updates the location of the virtual object.

In an implementation, the first detection module 100 may be specifically configured to: at intervals of n ticks, detect the first system integration time once after the previous speed update of the virtual object, and the second system integration time after the previous location update of the virtual object, where n is an integer not less than 1.

In an implementation, the client may be further configured to: detect a movement control operation of a user, and determine a movement control parameter of the virtual object that is indicated by the movement control operation of the user; update the location at a current speed of the virtual object according to the movement control parameter; send, to a server, a movement control operation request carrying the movement control parameter; after the server updates a speed and a location of the virtual object according to the movement control parameter, receive a movement update synchronization packet sent by the server; and update the speed of the virtual object according to the movement update synchronization packet.

In an implementation, the client may be further configured to: receive a movement update synchronization packet sent by a server; and update the speed and the location of the virtual object according to the movement update synchronization packet.

In an implementation, when updating the speed of the virtual object, the first updating module 110 may be specifically configured to: determine, according to a movement update synchronization packet that is lastly sent by a server, a speed update trend of the virtual object and an acceleration value corresponding to the speed update trend; and update the speed of the virtual object according to the speed update trend and the acceleration value.

In an implementation, when updating the location of the virtual object, the first updating module 110 may be specifically configured to: determine a current location orientation and a current speed of the virtual object; and update the location of the virtual object by using the current location orientation and the current speed.

In an implementation, the client may update the speed and/or the location of the virtual object based on a character controller.

In an implementation, the client may be further configured to define a movement model of the virtual object based on a character controller, where the movement model of the virtual object is implemented by using a shape.

Correspondingly, when updating the speed or the location of the virtual object based on the character controller, the client may be specifically configured to: perform linear cast processing on the movement model of the virtual object each time when updating the speed or the location of the virtual object, to proactively query a speed or a location of a virtual object in a physical world of a game, to update the speed or the location of the virtual object.

In an implementation, when defining a movement model of the virtual object based on a specific character controller, the client may be specifically configured to: use an extensible character controller to define movement models of an infantryman and a rider, to define different parameter combinations and settings by using the movement models of the infantryman and the rider, so that the movement model of the infantryman supports constant-speed or variable-speed rectilinear motion in any direction, and the movement model of the rider supports circular motion or variable circular motion.

In an implementation, the game client may be further configured to receive topographic walking layer data of a 3D scenario, physical collision data of a static object in the 3D scenario, and physical collision data of a dynamic object in the 3D scenario that are exported from a scenario editor and that are also received by a server.

In an implementation, the client may be further configured to: determine a response delay between the client and a server; if a preset buffer duration is greater than the response delay, determine that movement synchronization processing of the virtual object is normal; or if a preset buffer duration is less than the response delay, recalculate a first system time and a second system time.

In an implementation, the client may be further configured to: when receiving a movement update synchronization packet of a server, calculate a location difference between a locally determined first update location of the virtual object and a second update location of the virtual object indicated in the movement update synchronization packet of the server; and if the calculated location difference is greater than a preset location difference, in multiple set frames, linearly move the virtual object from the first update location of the virtual object to the second update location of the virtual object.

Figure 26:
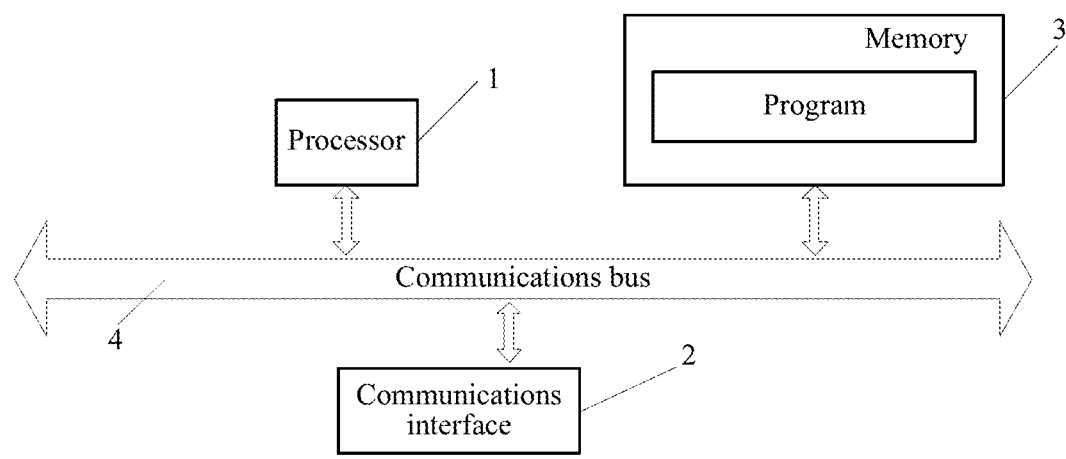
FIG. 26 shows a structural block diagram of hardware of a terminal device according to an embodiment of this disclosure.

The client may be disposed on a terminal device such as a mobile phone, a tablet computer, or a notebook. FIG. 26 is a structural block diagram of hardware of a terminal device provided with a client. Referring to FIG. 26, the terminal device may include: a processor 1, a communications interface 2, a memory 3, and a communications bus 4.

The processor 1, the communications interface 2, and the memory 3 communicate with each other by using the communications bus 4.

The communications interface 2 may be an interface of a communications module, for example, an interface of a GSM module.

The processor 1 is configured to execute a program.

The memory 3 is configured to store the program, where the program includes a client program.

The program may include program code, and the program code includes a computer operation instruction.

The processor 1 may be a central processing unit CPU, or an application-specific integrated circuit ASIC, or may be configured as one or more integrated circuits of the embodiments of the present disclosure.

The memory 3 may include a high-speed RAM memory, or may further include a non-volatile memory, such as at least one magnetic disk storage.

The program may be specifically used for:

detecting a first system integration time after a previous speed update of a virtual object, and a second system integration time after a previous location update of the virtual object; and updating a speed of the virtual object when the first system integration time reaches a preset speed update time; and updating a location of the virtual object when the second system integration time reaches a preset location update time.

The preset speed update time is greater than the preset location update time, the first system integration time is recalculated each time after the client updates the speed of the virtual object, and the second system integration time is recalculated each time after the client updates the location of the virtual object.

A server according to an embodiment of this disclosure is described below, and cross-reference may be made between the following descriptions and content of the foregoing method procedure accordingly.

Figure 27:
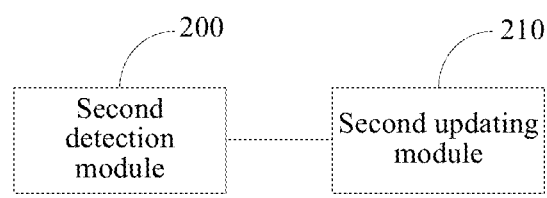
FIG. 27 shows a structural block diagram of a server according to an embodiment of this disclosure.

FIG. 27 is a structural block diagram of a server according to an embodiment of this disclosure. Referring to FIG. 27, the server may include:

a second detection module 200, configured to detect a system integration time after a previous speed and location update of a virtual object; and a second updating module 210, configured to: when it is detected that the system integration time reaches a preset update time, update a speed and a location of the virtual object, where the system integration time is recalculated each time after the server updates the speed and the location of the virtual object.

In an implementation, the second detection module 200 may be specifically configured to: at an interval of n ticks, detect the system integration time once after the previous speed and location update of the virtual object, where n is an integer not less than 1.

In an implementation, the server may be further configured to: receive a movement control operation request sent by a client, where the movement control operation request carries a movement control parameter; update the speed and the location of the virtual object according to the movement control parameter, generate a movement update synchronization packet, and send the movement update synchronization packet to the client.

In an implementation, the server may be further configured to: when detecting switch of a moving state of the virtual object, update the speed and the location of the virtual object, generate a movement update synchronization capsule, and send the movement update synchronization capsule to the client.

In an implementation, the server may update the speed and/or the location of the virtual object based on a character controller.

Correspondingly, when updating the speed or the location of the virtual object based on the character controller, the server may be specifically configured to: perform linear cast processing on a shape of the virtual object each time when updating the speed or the location of the virtual object, to proactively query a speed or a location of a virtual object in a physical world of a game, and update the speed or the location of the virtual object.

In an implementation, the server may be further configured to receive topographic walking layer data of a 3D scenario, physical collision data of a static object in the 3D scenario, and physical collision data of a dynamic object in the 3D scenario that are exported from a scenario editor and that are also received by a client.

In an implementation, the server may be further configured to: determine a location difference between an update location of the virtual object reported by the client and a location of the virtual object that is lastly determined by the server; and if the location difference is less than a preset location threshold, update the location of the virtual object to the update location reported by the client.

A hardware structure of the server provided in this embodiment of this disclosure may be shown in FIG. 26, and includes: a processor, a communications interface, a memory, and a communications bus.

The processor is configured to execute a program.

The memory is configured to store a program.

The program may be specifically used for:

detecting the system integration time after the previous speed and location update of the virtual object; and updating the speed and the location of the virtual object when it is detected that the system integration time reaches the preset update time, where the system integration time is recalculated each time after the server updates the speed and the location of the virtual object.

The embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are briefly described, and reference may be made to the method embodiments for the associated part.

Persons skilled in the art may further realize that, in combination with the units and algorithm, steps of each example described in the embodiments disclosed in this disclosure can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it should not be considered that the implementation goes beyond the scope of the embodiments of the present disclosure.

In combination with the steps of the method or algorithm described in the embodiments disclosed in this disclosure may be directly implemented by using hardware, a software module executed by a processor, or a combination thereof. The software module may be placed in a random access memory (RAM), a memory, a read-only memory (ROM), an electrically programmable ROM, an electrically erasable programmable ROM, a register, a hard disk, a removable magnetic disk, a CD-ROM, or any storage medium of other forms well-known in the technical field.

The above description of the disclosed embodiments enables persons skilled in the art to implement or use the present disclosure. Various modifications to these embodiments are possible and the general principles defined in this disclosure may be implemented in other embodiments without departing from the spirit and scope of the present disclosure. Therefore, the present disclosure is not limited to these embodiments illustrated in this disclosure, but needs to conform to the broadest scope consistent with the principles and novel features disclosed in this disclosure.

What is claimed is:

1. A method for motion synchronization of a virtual object, the method comprising, for each interval of n ticks during an operation of a terminal device, n being a positive integer, and a tick corresponding to a timing unit of processing circuitry of the terminal device:

determining whether a motion update synchronization packet is received from a server;

in response to the motion update synchronization packet being determined not to be received:

determining, by the processing circuitry of the terminal device, whether a first accumulation time reaches a first update time interval, the first accumulation time being accumulated from a previous speed update of the virtual object, and the first update time interval being set by the server;

determining, by the processing circuitry of the terminal device, whether a second accumulation time reaches a second update time interval, the second accumulation time being accumulated from a previous location update of the virtual object, and the first update time interval being greater than the second update time interval;

in response to the first accumulation time being determined as reaching the first update time interval, updating a speed of the virtual object and resetting the first accumulation time; and in response to the second accumulation time being determined as reaching the second update time interval, updating a location of the virtual object and resetting the second accumulation time; and in response to the motion update synchronization packet being determined as received, updating the speed of the virtual object based on a server-side speed of the virtual object specified in the motion update synchronization packet and resetting the first accumulation time.

2. The method according to claim 1, further comprising:

in response to the motion update synchronization packet being determined as received, updating the location of the virtual object based on a server-side location of the virtual object specified in the motion update synchronization packet and resetting the second accumulation time.

3. The method according to claim 1, wherein the updating the speed of the virtual object in response to the first accumulation time being determined as reaching the first update time interval comprises:

determining a speed update trend of the virtual object and a value of an acceleration of the virtual object corresponding to the speed update trend based on a most recent motion update synchronization packet received from the server; and updating the speed of the virtual object based on the speed update trend and the value of the acceleration of the virtual object.

4. The method according to claim 1, wherein the updating the location of the virtual object in response to the second accumulation time being determined as reaching the second update time interval comprises:

determining a current direction of motion and the speed of the virtual object; and updating the location of the virtual object based on the current direction of motion and the speed of the virtual object.

5. The method according to claim 1, wherein the first update time interval is a preset multiple of the second update time interval, and the preset multiple being an integer greater than 3.

6. The method according to claim 1, wherein the speed or the location of the virtual object is updated according to a character controller.

7. The method according to claim 6, further comprising:

defining a motion model of the virtual object based on the character controller, the motion model being implemented using a capsule shape, the virtual object being in a physical world of a virtual scenario;

performing linear projection of the motion model when the speed or the location of the virtual object is updated; and updating the speed or the location of the virtual object as a current speed or a current location of the virtual object in the physical world of the virtual scenario.

8. The method according to claim 7, wherein
the character controller is an expandable character controller that controls the virtual object and a second virtual object in a virtual game scenario;
the virtual object is an infantryman;
the second virtual object is a cavalryman; and
the defining the motion model of the virtual object based on the character controller includes:
defining, by using the character controller, a first motion model having a first combination of first parameters and first settings for the infantryman and a second motion model having a second combination of second parameters and second settings for the cavalryman, the first motion model supporting a linear motion of the infantryman in a direction, the second motion model supporting a circular motion or a variable circular motion of the cavalryman.

9. The method according to claim 6, further comprising:
receiving, by interface circuitry of the terminal device from a scenario editor, first data of a three-dimensional (3D) scenario that includes a topographic walking layer, a static object, and a dynamic object, the first data including topographic walking layer data, first physical collision data of the static object, and second physical collision data of the dynamic object, the first data being identical to second data of the 3D scenario, the second data being received by the server from the scenario editor, the scenario editor being used to edit the 3D scenario that the virtual object interacts with.

10. The method according to claim 1, further comprising, in response to reception of the motion update synchronization packet:
determining whether a location difference between the location of the virtual object determined by the processing circuitry and a server-side location of the virtual object specified in the motion update synchronization packet is greater than a preset threshold; and
moving the virtual object linearly from the location to the server-side location in a preset number of frames when the location difference is determined to be greater than the preset threshold.

11. The method according to claim 1, further comprising:
detecting a motion control operation on the virtual object by a user;
determining, by the processing circuitry of the terminal device, a set of motion control parameters for the virtual object based on the motion control operation, the set of motion control parameters including at least a speed control parameter and a location control parameter; and
sending a motion control operation request including the set of motion control parameters to the server.

12. A method for motion synchronization of a virtual object, the method comprising:
for each interval of n ticks during an operation of a server, n being a positive integer, and a tick corresponding to a timing unit of processing circuitry of the server:
determining whether a motion control operation request is received from a terminal device, the motion control operation request including a set of motion control parameters, the set of motion control parameters including at least a speed control parameter and a location control parameter;
in response to the motion control operation request being determined to not be received:
determining, by the processing circuitry of the server, whether a system accumulation time reaches a system update time interval, the system accumulation time being accumulated from a previous speed and location update of the virtual object by the server; and
in response to the system accumulation time being determined as reaching the system update time interval, updating a speed and a location of the virtual object and resetting the system accumulation time; and
in response to the motion control operation request being determined as received, updating the speed and the location of the virtual object based on the set of motion control parameters and resetting the system accumulation time; and
causing the terminal device to periodically determine a terminal-side updated speed of the virtual object based on a first update time interval set by the server and to periodically determine a terminal-side updated location of the virtual object based on a second update time interval, and the first update time interval being greater than the second update time interval.

13. The method according to claim 12, further comprising:
generating a motion update synchronization packet; and
sending the motion update synchronization packet to the terminal device.

14. The method according to claim 12, further comprising, when the server detects that the virtual object switches a motion state:
updating the speed and the location of the virtual object;
generating a motion update synchronization packet specifying the speed and the location of the virtual object as updated when the server detects that the virtual object switches the motion state; and
sending the motion update synchronization packet to the terminal device.

15. The method according to claim 12, wherein the method further comprises:
determining whether a location difference between a terminal-side location of the virtual object reported by the terminal device and the location of the virtual object determined by the server is greater than a preset threshold; and
updating the location of the virtual object to be the terminal-side location reported by the terminal device when the location difference is determined to be less than the preset threshold.

16. A non-transitory computer-readable storage medium storing a program which, when being executed by a processor, causes the processor of a terminal device to perform, for each interval of n ticks during an operation of the terminal device, n being a positive integer, and a tick corresponding to a timing unit of the processor of the terminal device:
determining whether a motion update synchronization packet is received from a server;
in response to the motion update synchronization packet being determined not to be received, performing:
determining whether a first accumulation time reaches a first update time interval, the first accumulation time being accumulated from a previous speed update of a virtual object, and the first update time interval being set by the server;

determining whether a second accumulation time reaches a second update time interval, the second accumulation time being accumulated from a previous location update of the virtual object, and the first update time interval being greater than the second update time interval;

in response to the first accumulation time being determined as reaching the first update time interval, updating a speed of the virtual object and resetting the first accumulation time; and in response to the second accumulation time being determined as reaching the second update time interval, updating a location of the virtual object and resetting the second accumulation time; and in response to the motion update synchronization packet being determined as received, updating the speed of the virtual object based on a server-side speed of the virtual object specified in the motion update synchronization packet and resetting the first accumulation time.

17. The non-transitory computer-readable storage medium according to claim 16, wherein the program, when executed by the processor, further causes the processor to perform:

in response to the motion update synchronization packet being determined as received, updating the location of the virtual object based on a server-side location of the virtual object specified in the motion update synchronization packet and resetting the second accumulation time.

18. The non-transitory computer-readable storage medium according to claim 16, wherein the program, when executed by the processor, further causes the processor to perform:

detecting a motion control operation on the virtual object by a user;

determining a set of motion control parameters for the virtual object based on the motion control operation, the set of motion control parameters including at least a speed control parameter and a location control parameter; and sending a motion control operation request including the set of motion control parameters to the server.

19. The non-transitory computer-readable storage medium according to claim 16, wherein the first update time interval is a preset multiple of the second update time interval, and the preset multiple being an integer greater than 3.

* * * * *